US012486485B2

(12) United States Patent
Tanabe et al.

(10) Patent No.: US 12,486,485 B2
(45) Date of Patent: Dec. 2, 2025

(54) CELL TREATMENT DEVICE, SUSPENSION CULTURE VESSEL, AND STEM CELL INDUCTION METHOD

(71) Applicants: I Peace, Inc., Palo Alto, CA (US); Koji Tanabe, Palo Alto, CA (US)

(72) Inventors: Koji Tanabe, Palo Alto, CA (US); Kenta Suto, Palo Alto, CA (US); Ryoji Hiraide, Kyoto (JP)

(73) Assignee: I Peace, Inc., Palo Alto, CA (US)

( * ) Notice: Subject to any disclaimer, the term of this patent is extended or adjusted under 35 U.S.C. 154(b) by 381 days.

(21) Appl. No.: 17/934,953

(22) Filed: Sep. 23, 2022

(65) Prior Publication Data

US 2023/0030031 A1     Feb. 2, 2023

Related U.S. Application Data

(63) Continuation of application No. 16/485,146, filed as application No. PCT/JP2018/006613 on Feb. 23, 2018, now abandoned.

(60) Provisional application No. 62/463,428, filed on Feb. 24, 2017.

(51) Int. Cl.
  *C12M 1/34* (2006.01)
  *C12M 1/00* (2006.01)
  *C12N 5/0735* (2010.01)

(52) U.S. Cl.
  CPC ............ *C12M 41/36* (2013.01); *C12M 23/02* (2013.01); *C12M 29/00* (2013.01); *C12N 5/0606* (2013.01)

(58) Field of Classification Search
  None
  See application file for complete search history.

(56) References Cited

U.S. PATENT DOCUMENTS

| | | | |
|---|---|---|---|
| 5,151,362 A | 9/1992 | Kawaguchi et al. | |
| 11,912,977 B2* | 2/2024 | Tanabe | C12M 45/02 |
| 2006/0205081 A1 | 9/2006 | Li et al. | |
| 2009/0068742 A1 | 3/2009 | Yamanaka | |
| 2009/0298181 A1 | 12/2009 | Watanabe et al. | |
| 2011/0250684 A1 | 10/2011 | Akamatsu et al. | |
| 2012/0115225 A1 | 5/2012 | Xu | |
| 2012/0301923 A1 | 11/2012 | Hoffmann et al. | |
| 2013/0345094 A1 | 12/2013 | Noggle et al. | |
| 2015/0072416 A1 | 3/2015 | Cho et al. | |

(Continued)

FOREIGN PATENT DOCUMENTS

| | | |
|---|---|---|
| JP | 2006-075041 A | 3/2006 |
| JP | 2008-017716 A | 1/2008 |

(Continued)

OTHER PUBLICATIONS

Chen et al. "Reprogramming in suspension." Nature methods | vol. 9 No. 5 | May 2012, pp. 449 and 451. (Year: 2012).*

(Continued)

*Primary Examiner* — William H. Beisner
(74) *Attorney, Agent, or Firm* — Studebaker Brackett PLLC

(57) ABSTRACT

This cell treatment device is provided with: a factor introduction device 30 for introducing a pluripotent induction factor into cells so as to prepare induction factor-introduced cells; and a reprogramming suspension culture vessel for culturing the induction factor-introduced cells that have been prepared by the factor introduction device 30.

9 Claims, 23 Drawing Sheets

(56) References Cited

U.S. PATENT DOCUMENTS

| | | |
|---|---|---|
| 2015/0306641 A1 | 10/2015 | Suzuki et al. |
| 2015/0314018 A1 | 11/2015 | Sahin et al. |
| 2016/0060588 A1 | 3/2016 | Nakatsuji et al. |
| 2016/0355774 A1 | 12/2016 | Konishi et al. |
| 2017/0067007 A1 | 3/2017 | Miltenyi et al. |
| 2017/0191033 A1 | 7/2017 | Azuma et al. |
| 2017/0247658 A1 | 8/2017 | Iseoka et al. |
| 2017/0306279 A1 | 10/2017 | Kagawa et al. |

FOREIGN PATENT DOCUMENTS

| | | |
|---|---|---|
| JP | 4183742 B1 | 11/2008 |
| JP | 2012-507264 A | 3/2012 |
| JP | 2014-114997 A | 6/2014 |
| JP | 2015-502747 A | 1/2015 |
| JP | 2015-165783 A | 9/2015 |
| JP | 2015-534826 A | 12/2015 |
| WO | 2013/180395 A1 | 12/2013 |
| WO | 2014/136581 A1 | 9/2014 |
| WO | 2015/122528 A1 | 8/2015 |
| WO | 2016/021709 A1 | 2/2016 |
| WO | 2016/076368 A1 | 5/2016 |
| WO | 2016/117615 A1 | 7/2016 |
| WO | 2017/038887 A1 | 3/2017 |

OTHER PUBLICATIONS

Shafa et al. "Derivation of iPscs in stirred suspension bioreactors." Nature methods | vol. 9 No. 5 | May 2012 | 465-466 with supplement. (Year: 2012).*

Sia et al. "Dynamic culture improves cell reprogramming efficiency." Biomaterials 92 (2016) 36-45. (Year: 2016).*

Portner et al. "High Density Fed-Batch Cultures for Hybridoma Cells Performed with the Aid of a Kinetic Model" Bioprocess Engineering 15 (1996) 117-124 (Year: 1996).

Nath et al. "Culture Medium Refinement by Dialysis for the Expansion of Human Induced Pluripotent Stem Cells in Supension Culture" Bioprocess Biosyst Eng (2017) 40:123-131. (Year: 2016).

Yodosha Co., Ltd. "Protocols for Regeneration, Drug Discovery and Disease Research and Essential Knowledge for Clinical Applications" Standards for ES/iPS Cell Experiments, Experimental Medicine Separate vol. Mar. 5, 2014, pp. 78-91.

Massimiliano Caiazzo et al. "Defined Three-Dimensional Microenvironments Boost Induction of Pluipotency" Nature Materials, pp. 344-352, vol. 15, Methods.

Thermo Fisher Scientific "Culture Environment in Cell Culture from the Basic" Oct. 18, 2016, www.thermofisher.com/blog/learning-at-the-bench/cell-culture-environment.

The Japanese Tissue Culture, Tissue Culture Technique (Third Edition), Sep. 10, 1997, pp. 259-260.

* cited by examiner (a)          (b)

(a)  (b)

TRA-1-60

TRA-1-60

(a) Dialysis tube (b) Container

CELL TREATMENT DEVICE, SUSPENSION CULTURE VESSEL, AND STEM CELL INDUCTION METHOD

CROSS-REFERENCE TO RELATED APPLICATIONS

This application is a Continuation of U.S. patent application Ser. No. 16/485,146 filed Aug. 9, 2019, which is the U.S. National Stage of International Application No. PCT/JP2018/006613 filed Feb. 23, 2018, which claims benefit of priority to U.S. Provisional Application No. 62/463,428 filed Feb. 24, 2017, the entire contents of which are incorporated herein by reference.

FIELD

The present invention relates to cell technology, and specifically to a cell treatment device, a suspension culture vessel and a stem cell induction method.

BACKGROUND

Embryonic stem cells (ES cells) are stem cells established from early embryos of humans or mice, for example. ES cells are pluripotent, being capable of differentiating into all cells in the body. At the current time, human ES cells are able to be used in cell transplantation therapy for numerous diseases including Parkinson's disease, juvenile onset diabetes and leukemia. However, certain barriers exist against transplantation of ES cells. In particular, transplantation of ES cells can provoke immunorejection similar to the rejection encountered after unsuccessful organ transplantation. Moreover, there are many ethical considerations as well as critical and dissenting opinions against the use of ES cell lines that have been established by destruction of human embryos.

It was against this background that Professor Shinya Yamanaka of Kyoto University successfully established a line of induced pluripotent stem cells (iPS cells) by transferring four genes: OCT3/4, KLF4, c-MYC and SOX2, into somatic cells. For this, Professor Yamanaka received the Nobel Prize in Physiology or Medicine in 2012 (see PTLs 1 and 2, for example). iPS cells are ideal pluripotent cells which are free of issues of rejection or ethical problems. Therefore, iPS cells are considered promising for use in cell transplantation therapy.

CITATION LIST

Patent Literature

[PTL 1] Japanese Patent Publication No. 4183742
[PTL 2] Japanese Unexamined Patent Publication No. 2014-114997

SUMMARY

Technical Problem

Devices and methods allowing efficient culturing of not only iPS cells but many other different types of cells are desired. It is therefore one object of the present invention to provide a cell treatment device, a suspension culture vessel and a stem cell induction method.

Solution to Problem

According to one aspect of the invention there is provided a cell treatment device comprising a factor introducing device that introduces a pluripotency inducing factor into cells to create inducing factor-introduced cells, and a suspension culture vessel for suspension culturing of the inducing factor-introduced cells created by the factor introducing device.

In this cell treatment device, the inducing factor-introduced cells may be reprogrammed inside the suspension culture vessel.

In this cell treatment device, the inducing factor-introduced cells may be reprogrammed and amplifying cultured inside the suspension culture vessel.

The suspension culture vessel of this cell treatment device may also comprise a semipermeable membrane in which the inducing factor-introduced cells and culture medium are placed, a container in which the semipermeable membrane is placed with the culture medium accommodated around the periphery of the semipermeable membrane, and a drive unit for agitation of the culture medium in the container. The semipermeable membrane may be in the form of a tube, for example.

In this cell treatment device, an agitating member may be provided in the container.

The drive unit in this cell treatment device may rotate the agitating member by magnetic force.

The suspension culture vessel in this cell treatment device may also comprise a semipermeable membrane in which the inducing factor-introduced cells and culture medium are placed, a container in which the semipermeable membrane is placed with the culture medium accommodated around the periphery of the semipermeable membrane, and with a helical groove provided on its inner surface, and a pump that supplies culture medium into the container so that the culture medium flows along the groove inside the container.

The inducing factor-introduced cells created by the factor introducing device of the cell treatment device may also be fed into the semipermeable membrane of the suspension culture vessel.

In this cell treatment device, the suspension culture vessel may also comprise a semipermeable membrane in which the culture medium is placed, a container in which the semipermeable membrane is placed with the inducing factor-introduced cells and culture medium accommodated around the periphery of the semipermeable membrane, and a pump that supplies culture medium into the semipermeable membrane so as to create a flow of the culture medium inside the semipermeable membrane.

The inducing factor-introduced cells created by the factor introducing device of the cell treatment device may also be fed outside of the semipermeable membrane inside the container.

The suspension culture vessel in this cell treatment device may also comprise a container in which the inducing factor-introduced cells and culture medium are placed, and a drive unit for agitation of the culture medium in the container.

In this cell treatment device, an agitating member may be provided in the container.

The drive unit in this cell treatment device may rotate the agitating member by magnetic force.

The suspension culture vessel in this cell treatment device may also comprise a container in which the inducing factor-introduced cells and culture medium are placed, the container being provided with a helical groove provided on its inner surface, and a pump that supplies culture medium into the container so that the medium flows along the groove inside the container.

The inducing factor-introduced cells created by the factor introducing device of the cell treatment device may also be fed into the container of the suspension culture vessel.

The culture medium in the cell treatment device may be a liquid medium.

The culture medium in the cell treatment device may also be a gel medium.

According to one aspect of the invention there is provided a suspension culture vessel comprising a semipermeable membrane in which cells and culture medium are placed, a container in which the semipermeable membrane is placed, having the culture medium accommodated around the periphery of the semipermeable membrane, and an agitating member provided inside the container.

This suspension culture vessel may further comprise a drive unit for agitation of the culture medium in the container.

The drive unit in this suspension culture vessel may rotate the agitating member by magnetic force.

According to one aspect of the invention there is provided a suspension culture vessel comprising a semipermeable membrane in which cells and culture medium are placed, and a container in which the semipermeable membrane is placed, having the culture medium accommodated around the periphery of the semipermeable membrane and being provided with a helical groove provided on its inner surface.

This suspension culture vessel may further comprise a pump that supplies culture medium into the container so that the culture medium flows along the groove inside the container.

According to one aspect of the invention there is provided a suspension culture vessel comprising a container in which cells and culture medium are placed, the container having a helical groove provided on its inner surface.

This suspension culture vessel may further comprise a pump that supplies culture medium into the container so that the culture medium flows along the groove inside the container.

According to one aspect of the invention there is provided a suspension culture vessel comprising a semipermeable membrane in which culture medium is placed, and a container in which the semipermeable membrane is placed, having cells and culture medium accommodated around the periphery of the semipermeable membrane.

This suspension culture vessel may further comprise a pump that supplies culture medium into the semipermeable membrane so as to create a flow of the culture medium inside the semipermeable membrane.

The culture medium in the suspension culture vessel may be a liquid medium.

The culture medium in the suspension culture vessel may also be a gel medium.

According to one aspect of the invention there is provided a stem cell induction method that includes introducing a pluripotency inducing factor into cells to create inducing factor-introduced cells, and suspension culturing the inducing factor-introduced cells to reprogram the inducing factor-introduced cells.

The suspension culture in this stem cell induction method may be agitation culture.

In this stem cell induction method, liquid medium may be used during suspension culture of the inducing factor-introduced cells.

In this stem cell induction method, gel medium may be used during suspension culture of the inducing factor-introduced cells.

According to one aspect of the invention there is provided a cell induction method that includes introducing an inducing factor into cells to create inducing factor-introduced cells, and suspension culturing the inducing factor-introduced cells to induce target somatic cells.

In this cell induction method, the suspension culture may be agitation culture.

In this cell induction method, liquid medium may be used during suspension culture of the inducing factor-introduced cells.

In this cell induction method, gel medium may be used during suspension culture of the inducing factor-introduced cells.

Advantageous Effects of Invention

According to the invention it is possible to provide a cell treatment device, a suspension culture vessel and a stem cell induction method.

DESCRIPTION OF EMBODIMENTS

Figure 1:
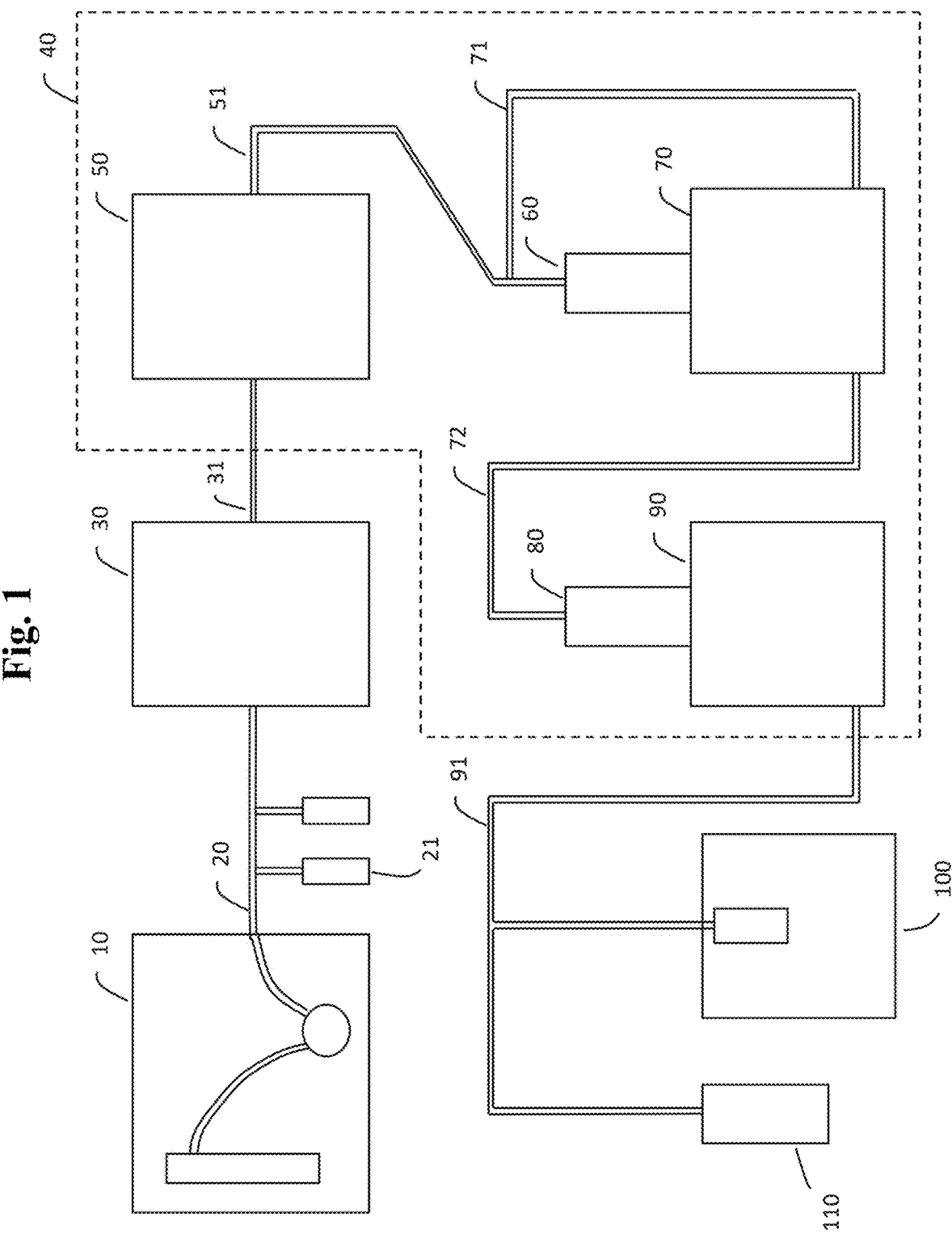
FIG. 1 is a schematic view of a cell treatment device according to an embodiment.

An embodiment of the invention will now be explained. In the accompanying drawings, identical or similar parts will be indicated by identical or similar reference numerals. However, the drawings are only schematic representations. The specific dimensions, therefore, should be judged in light of the following explanation. Furthermore, this naturally includes parts that have different dimensional relationships and proportions between drawings.

As shown in FIG. 1, the cell treatment device of this embodiment comprises a factor introducing device 30 that introduces a pluripotency inducing factor into cells to create inducing factor-introduced cells, a reprogramming suspension culture vessel for culturing of the inducing factor-introduced cells that have been created by the factor introducing device 30, and an amplifying suspension culture vessel for carrying out amplifying culturing of a plurality of cell masses comprising stem cells that have been established in the reprogramming suspension culture vessel. Alternatively, the inducing factor-introduced cells may be cultured in the same suspension culture vessel, without separately providing a reprogramming suspension culture vessel and an amplifying suspension culture vessel, to induce the stem cells.

The cell treatment device may also comprise, for example, a separating device 10 that separates cells from blood, and a preintroduction cell solution-feeding channel 20 through which a solution containing the cells separated by the separating device 10 passes. The preintroduction cell solution-feeding channel 20 is connected to the factor introducing device 30. The cell treatment device may also comprise an inducing factor solution-feeding mechanism 21 that feeds a pluripotency inducing factor into the preintroduction cell solution-feeding channel 20 or factor introducing device 30.

The reprogramming suspension culture vessel and the amplifying suspension culture vessel constitute at least part of a cell mass preparation device 40 wherein the inducing factor-introduced cells are cultured to create a plurality of cell masses comprising stem cells. The cell treatment device may also comprise a packaging device 100 that packages each of the plurality of cell masses in order.

The separating device 10 receives vials containing human blood, for example. The separating device 10 comprises an anticoagulant tank that stores anticoagulants such as ethylenediaminetetraacetic acid (EDTA), heparin and biologically standardized blood storage Solution A (ACD Solution A, product of Terumo Corp.), for example. The separating device 10 employs a pump or the like to add an anticoagulant to human blood from the anticoagulant tank.

In addition, the separating device 10 comprises a separating reagent tank that stores a mononuclear cell separating reagent such as Ficoll-Paque PREMIUM® (product of GE Healthcare, Japan). The separating device 10 employs a pump or the like to inject 5 mL of mononuclear cell separating reagent from the separating reagent tank into each of two 15 mL tubes, for example. Resin bags may also be used instead of tubes.

The separating device 10 also comprises a buffering solution tank that stores a buffering solution such as phosphate-buffered saline (PBS). The separating device 10 employs a pump to add 5 mL of buffering solution from the buffering solution tank to 5 mL of human blood, for example, to dilute it. In addition, the separating device 10 employs a pump or the like to add 5 mL of the diluted human blood to each of the mononuclear cell separating reagents in the tubes.

The separating device 10 further comprises a temperature-adjustable centrifuge. The centrifuge may be set to 18° C., for example. The separating device 10 employs a moving apparatus or the like to place the tubes in which the mononuclear cell separating reagent and human blood have been placed, into holders of the centrifuge. The centrifuge performs centrifugation of the solutions in the tubes for 30 minutes at 400×g, for example. Resin bags may also be centrifuged instead of tubes.

After centrifugation, the separating device 10 collects the intermediate layers that have become turbid and white by the mononuclear cells in the solutions in the tubes, using a pump or the like. The separating device 10 employs a pump or the like to deliver the recovered mononuclear cell suspensions to the preintroduction cell solution-feeding channel 20. Alternatively, the separating device 10 also adds 12 mL of PBS, for example, to 2 mL of the recovered mononuclear cell solutions, and places the tubes in holders of the centrifuge. The centrifuge performs centrifugation of the solutions in the tubes for 10 minutes at 200×g, for example.

After centrifugation, the separating device 10 employs a pump or the like to remove the supernatants of the solutions in the tubes by suction, and adds 3 mL of mononuclear cell medium such as X-VIVO 10® (Lonza, Japan) to the mononuclear cell solutions in the tubes to prepare suspensions. The separating device 10 employs a pump or the like to deliver the mononuclear cell suspensions to the preintroduction cell solution-feeding channel 20. The separating device 10 may also employ a dialysis membrane to separate the mononuclear cells from the blood. When using somatic cells such as fibroblasts previously separated from skin or the like, the separating device 10 is not necessary.

The separating device 10 may also separate cells suitable for induction by a method other than centrifugal separation. For example, if the cells to be separated are T cells, cells that are CD3-, CD4- or CD8-positive may be separated by panning. If the cells to be separated are vascular endothelial precursor cells, then cells that are CD34-positive may be separated by panning. If the cells to be separated are B cells, then cells that are CD10-, CD19- or CD20-positive may be separated by panning. The separation may also be carried out by a magnetic-activated cell sorting (MACS) method or by flow cytometry, without any limitation to panning. Moreover, the cells suitable for induction are not limited to cells derived from blood.

The inducing factor solution-feeding mechanism 21 comprises an inducing factor introducing reagent tank that stores an inducing factor introducing reagent solution. The inducing factor introducing reagent solution such as a gene transfer reagent solution includes, for example, an electroporation solution such as Human T Cell Nucleofector® (Lonza, Japan), a supplement solution, and a plasmid set. The plasmid set includes, for example, 0.83 µg of pCXLE-hOCT3/4-shp53-F, 0.83 µg of pCXLE-hSK, 0.83 µg of pCE-hUL and 0.5 µg of and pCXWB-EBNA1. The inducing factor solution-feeding mechanism 21 employs a micropump or the like to deliver the inducing factor introducing reagent solution to the preintroduction cell solution-feeding channel 20, in such a manner that the mononuclear cell suspension is suspended in the inducing factor introducing reagent solution.

The inner wall of the preintroduction cell solution-feeding channel 20 may be coated with poly-HEMA (poly 2-hydroxyethyl methacrylate) to render it non-cell-adherent, so that the cells do not adhere. Alternatively, a material resistant to cell adhesion may be used as the material for the preintroduction cell solution-feeding channel 20. Also, by using a material with good thermal diffusivity and $CO_2$ permeability as the material of the preintroduction cell solution-feeding channel 20, the conditions in the preintroduction cell solution-feeding channel 20 will be equivalent to the surrounding temperature and $CO_2$ concentration. In addition, a back-flow valve may be provided in the preintroduction cell solution-feeding channel 20 from the viewpoint of preventing contamination.

The factor introducing device 30 connected to the preintroduction cell solution-feeding channel 20 is an electroporator, for example, and it receives a liquid mixture of the inducing factor introducing reagent solution and mononuclear cell suspension and carries out plasmid electroporation in the mononuclear cells. After carrying out electroporation, the factor introducing device 30 adds mononuclear cell medium to the solution containing the plasmid-electroporated mononuclear cells. The factor introducing device 30 employs a pump or the like to deliver the solution containing the plasmid-electroporated mononuclear cells (hereunder referred to as "inducing factor-introduced cells") to the introduced cell solution-feeding channel 31.

The factor introducing device 30 is not limited to an electroporator. The factor introducing device 30 may also introduce RNA coding for an reprogramming factor into the cells by a lipofection method. Lipofection is a method in which a complex of nucleic acid as a negatively charged substance with positively charged lipids, is formed by electrical interaction, and the complex is incorporated into cells by endocytosis or membrane fusion. Lipofection is advantageous as it creates minimal damage to cells and has excellent introduction efficiency, while operation is convenient and less time is required. In addition, since there is no possibility of the reprogramming factor being inserted into the genome of the cells in lipofection, there is no need to confirm the presence or absence of insertion of exogenous genes by full genome sequencing of the obtained stem cells. Reprogramming factor RNA used as a pluripotency inducing factor may include, for example, OCT3/4 mRNA, SOX2 mRNA, KLF4 mRNA, and c-MYC mRNA. The gene symbols used here refer to human genes, but there is no intention to restrict the species by the use of uppercase or lowercase symbols. For example, even if all of the symbols are uppercase, this is not intended to exclude genes of mice or rats. In the Examples, however, the gene symbols given are according to the actual biological species used.

Lipofection of reprogramming factor RNA uses small interfering RNA (siRNA) or a lipofection reagent, for example. An siRNA lipofection reagent or mRNA lipofection reagent may be used as an RNA lipofection reagent. More specifically, the RNA lipofection reagent used may be Lipofectamine® RNAiMAX (Thermo Fisher Scientific), Lipofectamine® MessengerMAX (Thermo Fisher Scientific), Lipofectamin® 2000, Lipofectamin® 3000, Neon-Transfection System (Thermo Fisher scientific), Stemfect RNA transfection reagent (Stemfect), NextFect® RNA Transfection Reagent (BiooSientific), Amaxa® Human T cell Nucleofector® kit (Lonza, VAPA-1002), Amaxa® Human CD34 cell Nucleofector® kit (Lonza, VAPA-1003), or ReproRNA® transfection reagent STEMCELL Technologies).

When the factor introducing device 30 is to introduce an reprogramming factor into cells by lipofection, the reprogramming factor RNA and reagents are introduced into the preintroduction cell solution-feeding channel 20 by the inducing factor solution-feeding mechanism 21.

Figure 2:
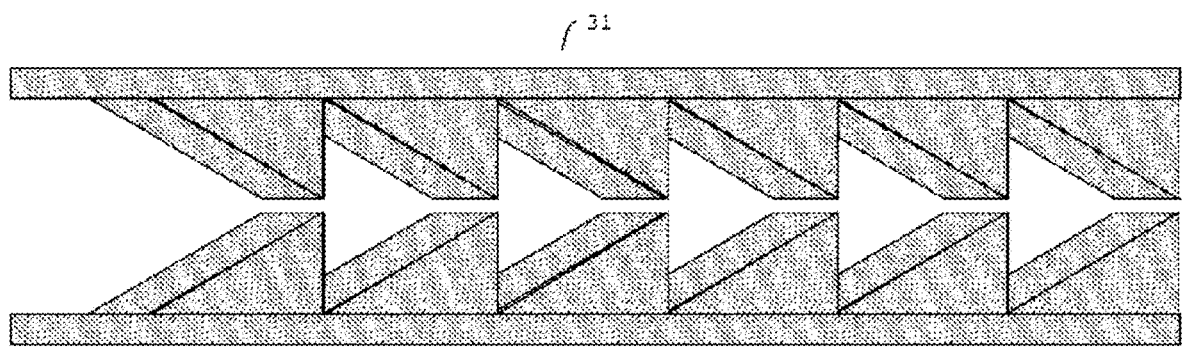
FIG. 2 is a schematic cross-sectional view of an example of an introduced cell solution-feeding channel in a cell treatment device according to an embodiment.
Figure 3:
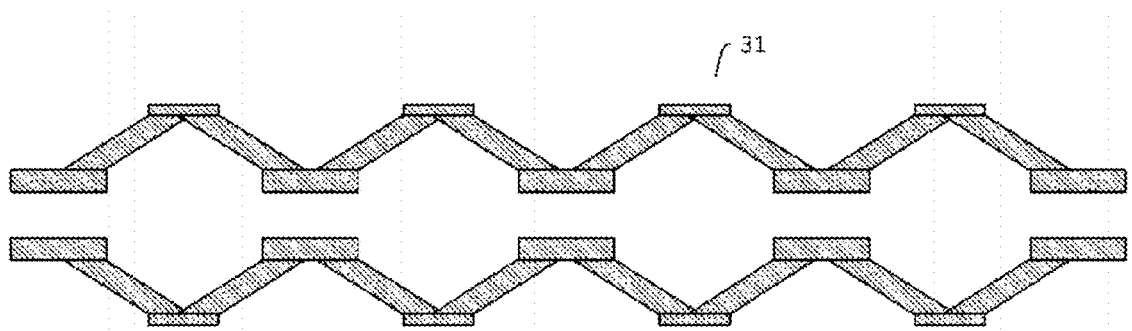
FIG. 3 is a schematic cross-sectional view of an example of an introduced cell solution-feeding channel in a cell treatment device according to an embodiment.

The inner wall of the introduced cell solution-feeding channel 31 may be coated with poly-HEMA to render it non-adhesive, so that the cells do not adhere. Alternatively, a material resistant to cell adhesion may be used as the material for the introduced cell solution-feeding channel 31. Also, by using a material with good thermal diffusivity and $CO_2$ permeability as the material for the introduced cell solution-feeding channel 31, the conditions in the introduced cell solution-feeding channel 31 will be equivalent to the controlled temperature and $CO_2$ concentration of the surroundings. In addition, a back-flow valve may be provided in the introduced cell solution-feeding channel 31 from the viewpoint of preventing contamination. Numerous cells die after electroporation, and cell masses of dead cells often result. Therefore, a filter may be provided in the introduced cell solution-feeding channel 31 to remove the dead cell masses. Alternatively, as shown in FIG. 2, one or a plurality of folds may be formed in the interior of the introduced cell solution-feeding channel 31 to intermittently vary the inner diameter. As another alternative, the inner diameter of the introduced cell solution-feeding channel 31 may be intermittently varied, as shown in FIG. 3.

As shown in FIG. 1, the cell mass preparation device 40 connected to the introduced cell solution-feeding channel 31 comprises a reprogramming culturing apparatus 50 that cultures the inducing factor-introduced cells prepared at the factor introducing device 30, a first dissociating mechanism 60 that dissociates the cell mass comprising stem cells (cell colonies) established at the reprogramming culturing apparatus 50 into a plurality of cell masses, an amplifying culturing apparatus 70 that carries out amplifying culturing of the plurality of cell masses that have been dissociated at the first dissociating mechanism 60, a second dissociating mechanism 80 that dissociates the cell mass comprising stem cells that have been amplifying cultured at the amplifying culturing apparatus 70 into a plurality of cell masses, and a cell mass transport mechanism 90 that delivers the plurality of cell masses in order to the packaging device 100.

Figure 4:
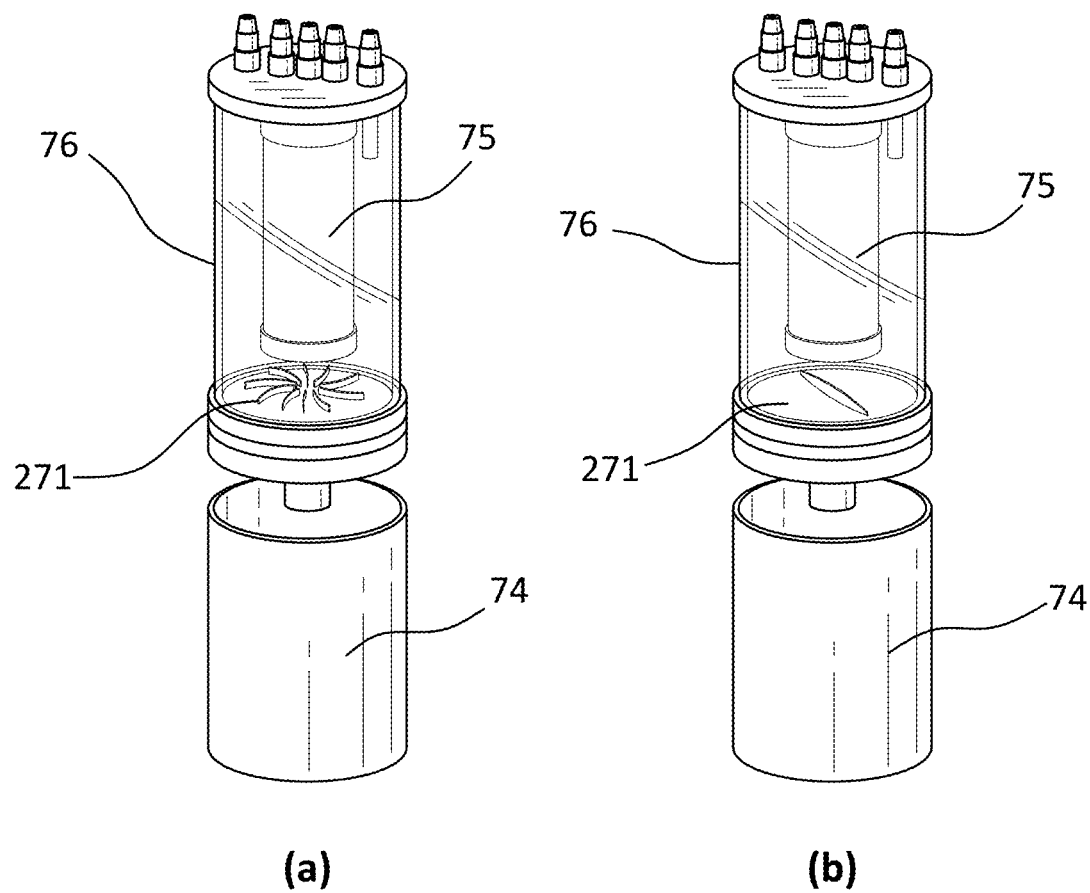
FIG. 4 is a schematic perspective view of a suspension culture vessel according to an embodiment.
Figure 5:
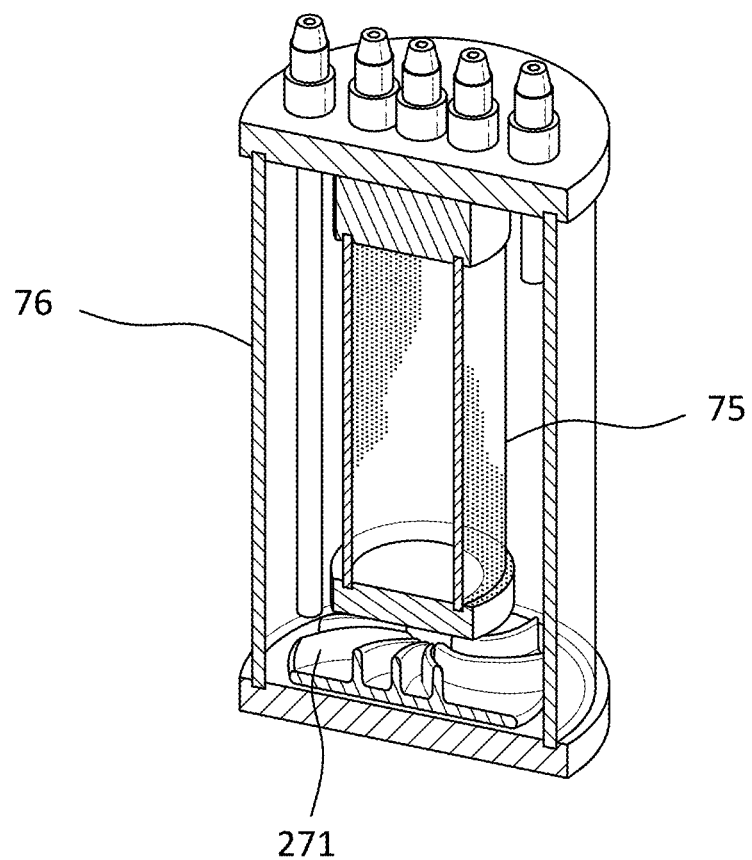
FIG. 5 is a schematic cross-sectional view of a suspension culture vessel according to an embodiment.
Figure 6:
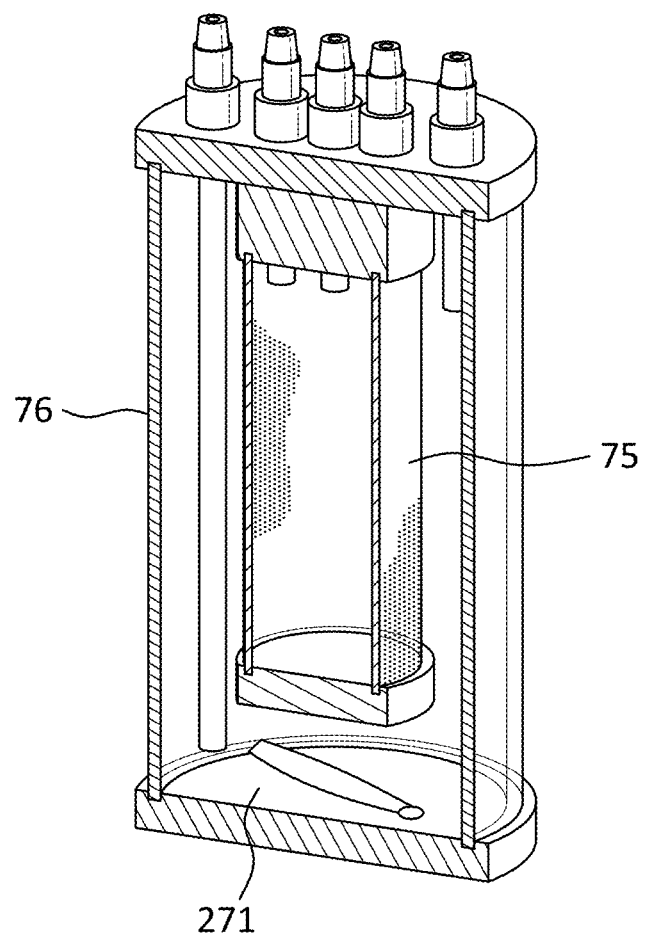
FIG. 6 is a schematic cross-sectional view of a suspension culture vessel according to an embodiment.

The reprogramming culturing apparatus 50 comprises a reprogramming suspension culture vessel as shown in FIG. 4 to FIG. 6, for example. The reprogramming suspension culture vessel comprises a dialysis tube 75 in which the inducing factor-introduced cells and culture medium are placed, a container 76 in which the dialysis tube 75 is placed, with the culture medium accommodated around the periphery of the dialysis tube 75, and a drive unit 74 for agitation of the culture medium in the container 76.

The inducing factor-introduced cells created by the factor introducing device 30 as shown in FIG. 1 are fed into the dialysis tube 75 of the reprogramming suspension culture vessel shown in FIG. 4 to FIG. 6.

The dialysis tube 75 is made of a semipermeable membrane, and it allows permeation of ROCK inhibitor, for example. The molecular cutoff of the dialysis tube 75 is ≥0.1 KDa, ≥10 KDa, or ≥50 KDa. The dialysis tube 75 is made of, for example, cellulose ester, ethyl cellulose, a cellulose ester derivative, regenerated cellulose, polysulfone, polyacrylnitrile, polymethyl methacrylate, ethylenevinyl alcohol copolymer, polyester-based polymer alloy, polycarbonate, polyamide, cellulose acetate, cellulose diacetate, cellulose triacetate, copper ammonium rayon, saponified cellulose, a Hemophan membrane, a phosphatidylcholine membrane or a vitamin E coated membrane.

The vessel 76 may be a circular column, for example, but this is not limitative. The side walls of the container 76 are made of a transparent material such as polypropylene or glass, for example. The vessel 76 may also be $CO_2$-permeable. G-Rex® (Wilson Wolf) may be used as a $CO_2$-permeable vessel 76.

The inducing factor-introduced cells are placed in the dialysis tube 75. A solution-feeding channel may be connected to the dialysis tube 75 to feed cell-containing culture medium into the dialysis tube 75. A solution-feeding channel may also be connected to the dialysis tube 75 to feed the cell-containing culture medium in the dialysis tube 75 to the outside of the container.

The culture medium to be accommodated in the container 76 and dialysis tube 75 is blood cell culture medium or stem cell culture medium, for example. As an example, blood cell culture medium may be used at the start of reprogramming culturing, and stem cell culture medium used thereafter. The stem cell culture medium used may be human ES/iPS culture medium such as Primate ES Cell Medium (Repro-CELL), for example.

The stem cell culture medium is not limited to this, however, and various stem cell culture media may be used. For example, Primate ES Cell Medium, Reprostem, ReproFF, ReproFF2, ReproXF (Reprocell), mTeSR1, TeSR2, TeSRE8, ReproTeSR (STEMCELL Technologies), PluriSTEM® Human ES/iPS Medium (Merck), NutriStem® XF/FF Culture Medium for Human iPS and ES Cells, Pluriton reprogramming medium (Stemgent), PluriSTEM®, Stemfit AK02N, Stemfit AK03 (Ajinomoto), ESC-Sure® serum and feeder free medium for hESC/iPS (Applied StemCell) and L7® hPSC Culture System (LONZA) may be used.

The culture medium may be non-gel liquid medium, or it may be gel medium.

When the culture medium is gel medium, the gel medium may include one or more high molecular compounds selected from the group consisting of gellan gum, deacylated gellan gum, hyaluronic acid, rhamsan gum, diutan gum, xanthan gum, carrageenan, fucoidan, pectin, pectic acid, pectinic acid, heparan sulfate, heparin, heparitin sulfate, keratosulfate, chondroitin sulfate, dermatan sulfate, rhamnan sulfate, and salts of the foregoing. The gel medium may also include methyl cellulose. Including methyl cellulose allows greater control of aggregation between the cells.

Alternatively, the gel medium may include at least one temperature-sensitive gel selected from among poly(glycerol monomethacrylate) (PGMA), poly(2-hydroxypropyl methacrylate) (PHPMA), poly (N-isopropylacrylamide) (PNIPAM), amine terminated, carboxylic acid terminated, maleimide terminated, N-hydroxysuccinimide (NHS) ester terminated, triethoxysilane terminated, poly (N-isopropylacrylamide-co-acrylamide), poly (N-isopropylacrylamide-co-acrylic acid), poly (N-isopropylacrylamide-co-butylacrylate), poly (N-isopropylacrylamide-co-methacrylic acid), poly (N-isopropylacrylamide-co-methacrylic acid-co-octadecyl acrylate) and N-isopropylacrylamide.

An agitating member 271 is provided inside the container 76, optionally at the bottom. The shape of the agitating member 271 may be any shape, such as rod-shaped, or flat with stirring blades. The agitating member 271 may comprise a metal that responds to magnetic force. The drive unit 74 rotates the agitating member 271 inside the container 76 by magnetic force, for example. The culture medium is thus agitated inside the container 76, and suspension culture of the cells is carried out in the dialysis tube 75. During this time, it is primarily the culture medium outside of the dialysis tube 75 in the container 76 that is agitated. Either the flow rate of the culture medium in the dialysis tube 75 is slower than the flow rate of the culture medium on the outside of the dialysis tube 75 in the container 76, or the culture medium in the dialysis tube 75 undergoes essentially no flow.

In the culture medium that is being agitated, the iPS cells randomly impact and become coupled with each other, often forming cell masses (colonies) of various sizes. The homogeneity between colonies is therefore often to maintain. In addition, nutrients or growth factors fail to reach the colony interiors when the colonies are excessively large, sometimes resulting in differentiation and cell death taking place from the interiors. Colonies that are too small, on the other hand, are often unsuitable for subculturing. In the dialysis tube 75, however, since either the flow rate of culture medium is slower or the culture medium does not flow, impact between cells occurs with lower frequency. It is therefore possible to maintain clonality among the colonies. Therefore, when the stem cells are iPS cells, for example, it is possible to ensure the clonality of iPS cells derived from a single somatic cell. Moreover, since the frequency of impact between the stem cells is low, it is possible to maintain homogeneity of size in the stem cell colonies.

The medium placed in the dialysis tube 75 does not need to include a ROCK inhibitor. The ROCK inhibitor may be added to the culture medium placed around the dialysis tube 75 in the container 76, to a final concentration of 1000 µmol/L to 0.1 µmol/L, 100 µmol/L to 1 µmol/L, or 5 µmol/L to 20 µmol/L, for example. By adding a ROCK inhibitor to the medium surrounding the dialysis tube 75, the ROCK inhibitor will penetrate into the dialysis tube 75 and colony formation by the cells will be promoted.

The medium may either include or not include growth factors such as basic fibroblast growth factor (bFGF) or TGF-β.

During suspension culturing of the cells in the dialysis tube 75, the medium surrounding the dialysis tube 75 in the container 76 is exchanged. Medium exchange includes partial exchange of the culture medium, as well as replenishment. In this case, the medium in the dialysis tube 75 does not need to be supplied. The medium may instead be supplied into the dialysis tube 75 during suspension culturing of the cells in the dialysis tube 75. In this case, the medium surrounding the dialysis tube 75 in the container 76 does not need to be supplied.

The reprogramming suspension culture vessel may also comprise a pH sensor that measures the hydrogen ion exponent (pH) of the medium surrounding the dialysis tube 75.

The cell treatment device of this embodiment uses a supply culture medium solution-feeding pump as a culture medium supply device to exchange or supply medium surrounding the dialysis tube 75 in the container 76 of the reprogramming suspension culture vessel. The supply culture medium solution-feeding pump used may be a pump used for drip infusion. The supply culture medium solution-feeding pump and the container 76 of the reprogramming suspension culture vessel are connected by a solution-feeding tube. The supply culture medium solution-feeding pump feeds culture medium into the container 76 of the reprogramming suspension culture vessel through the solution-feeding tube. A waste liquid tube is connected to the container 76 of the reprogramming suspension culture vessel. The culture medium in the container 76 of the reprogramming suspension culture vessel is discharged through the waste liquid tube. The culture medium in the container 76 of the reprogramming suspension culture vessel may be discharged, for example, by the pressure of fresh culture medium supplied by the supply culture medium solution-feeding pump, or it may be discharged utilizing gravity, or it may be discharged by a discharge pump.

The temperature of the culture medium to be fed from the supply culture medium solution-feeding pump to the reprogramming suspension culture vessel is set, for example, so that the temperature of the culture medium in the reprogramming suspension culture vessel does not vary drastically. For example, when the temperature of the medium in the reprogramming suspension culture vessel is 37° C., the temperature of the medium fed to the reprogramming suspension culture vessel is set to 37° C. However, the culture medium before it is fed to the reprogramming suspension culture vessel may be set in cold storage at a low temperature of 4° C., for example, at the cold storage unit.

The supply culture medium solution-feeding pump is controlled so that, for example, the amount of the culture medium fed into the container 76 of the reprogramming suspension culture vessel by the supply culture medium solution-feeding pump and the amount of the culture medium discharged from the container 76 of the reprogramming suspension culture vessel are equal. The supply culture medium solution-feeding pump may feed the culture medium into the container 76 of the reprogramming suspension culture vessel constantly, or it may feed the gel medium at appropriate intervals.

When the medium is delivered constantly, the flow rate of the medium being fed may be either constant or variable. For example, the culture medium and the cell masses in the culture medium may be monitored with a photographing device, and the flow rate of the medium being fed may be increased or decreased depending on the state of the culture medium and the cell mass in the culture medium.

Also, instead of constant feeding of the medium, feeding of the medium may be started and stopped depending on the state of the culture medium and the cell masses in the culture medium. In this case as well, the flow rate of the medium being fed may be increased or decreased depending on the state of the culture medium and the cell masses in the culture medium.

If the flow rate of the medium being fed to the reprogramming suspension culture vessel is too high, the cells in the reprogramming suspension culture vessel may undergo damage by the pressure of the gel medium. Therefore, the flow rate of the medium being delivered to the reprogramming suspension culture vessel is set so that the cells do not suffer damage.

When culturing of the cells is to be continued without exchange of the culture medium, accumulation of waste products such as lactic acid discharged by the cells, or variation in pH, can adversely affect the cell culture. In addition, proteins including bFGF or recombinant proteins present in the culture medium may be degraded, resulting in loss of the components necessary for cell culturing.

To counter this, fresh culture medium may be fed to the reprogramming suspension culture vessel by the supply culture medium solution-feeding pump, and the old culture medium discharged from the reprogramming suspension culture vessel, to remove waste products from the reprogramming suspension culture vessel, to keep the pH in the culture medium in a suitable range, and to allow supply of the components necessary for culturing of the cells. This will allow the state of the culture medium to be kept nearly constant.

The supply culture medium solution-feeding pump and the container 76 of the reprogramming suspension culture vessel may be connected by a solution-feeding tube, and the supply culture medium solution-feeding pump and the interior of the dialysis tube 75 in the container 76 of the reprogramming suspension culture vessel may also be connected by a solution-feeding tube. By feeding fresh culture medium into the dialysis tube 75, waste products present in the culture medium in the dialysis tube 75 are discharged out of the dialysis tube 75. This also allows the pH of the culture medium in the dialysis tube 75 to be kept in a suitable range, and allows the components necessary for culturing of the cells to be supplied to the culture medium in the dialysis tube 75.

Figure 7:
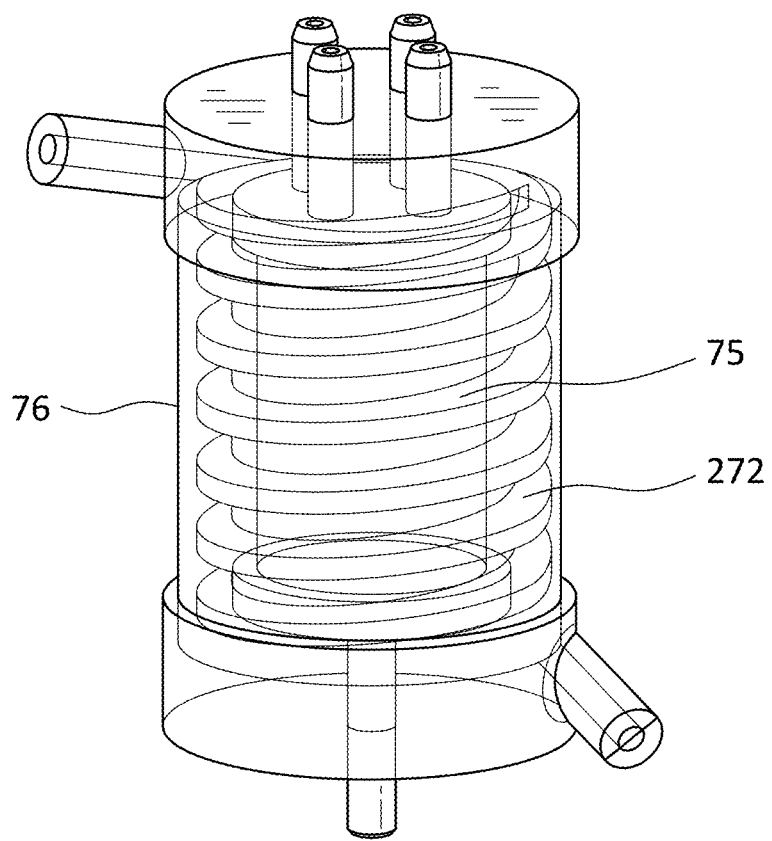
FIG. 7 is a schematic perspective view of a suspension culture vessel according to an embodiment.
Figure 8:
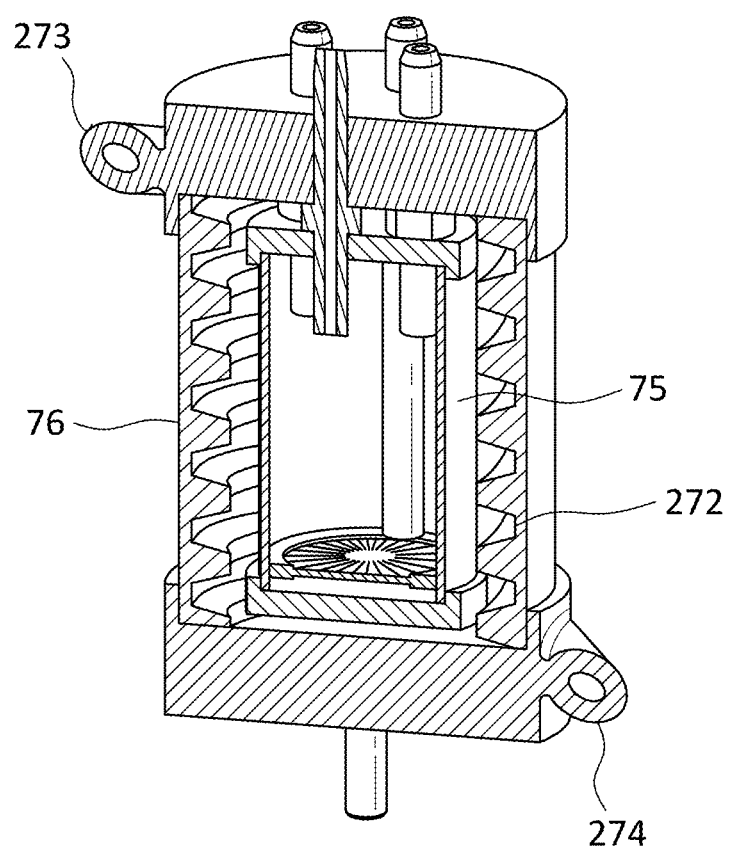
FIG. 8 is a schematic cross-sectional view of a suspension culture vessel according to an embodiment.

The structure of the reprogramming suspension culture vessel is not limited to the structure illustrated in FIG. 4 to FIG. 6. For example, the reprogramming suspension culture vessel illustrated in FIG. 7 and FIG. 8 comprises a dialysis tube 75 in which inducing factor-introduced cells and culture medium are placed, a container 76 in which the dialysis tube 75 is placed, with the culture medium accommodated around the periphery of the dialysis tube 75 and the container 76 having a helical groove 272 provided on its inner surface, and a pump that supplies culture medium into the container 76 so that the culture medium flows along the groove 272 inside the container 76.

The vessel 76 of the reprogramming suspension culture vessel is provided with first communicating pores 273 allowing communication between the inside and outside of the container 76, while the bottom of the container 76 is provided with second communicating pores 274 that allow communication between the inside and outside of the container 76. For example, culture medium is introduced into the container 76 through the first communicating pores 273, and the introduced culture medium is directed to the bottom of the container 76 while a rotational flow is produced along the groove 272, so that it is discharged out of the container 76 through the second communicating pores 274. The culture medium that has been discharged through the second communicating pores 274 may be re-introduced into the container 76 through the first communicating pores 273, via a circulating channel.

Alternatively, culture medium may be introduced into the container 76 through the second communicating pores 274, and the introduced culture medium may be directed to the top of the container 76 while a rotational flow is produced along the groove 272, so that it is discharged out of the container 76 through the first communicating pores 273. The culture medium that has been discharged through the first communicating pores 273 may be re-introduced into the container 76 through the second communicating pores 274, via a circulating channel.

The helical groove 272 may be provided directly on the inner wall of the container 76, or an element provided with a helical groove may be set on the inner wall of the container 76.

Figure 9:
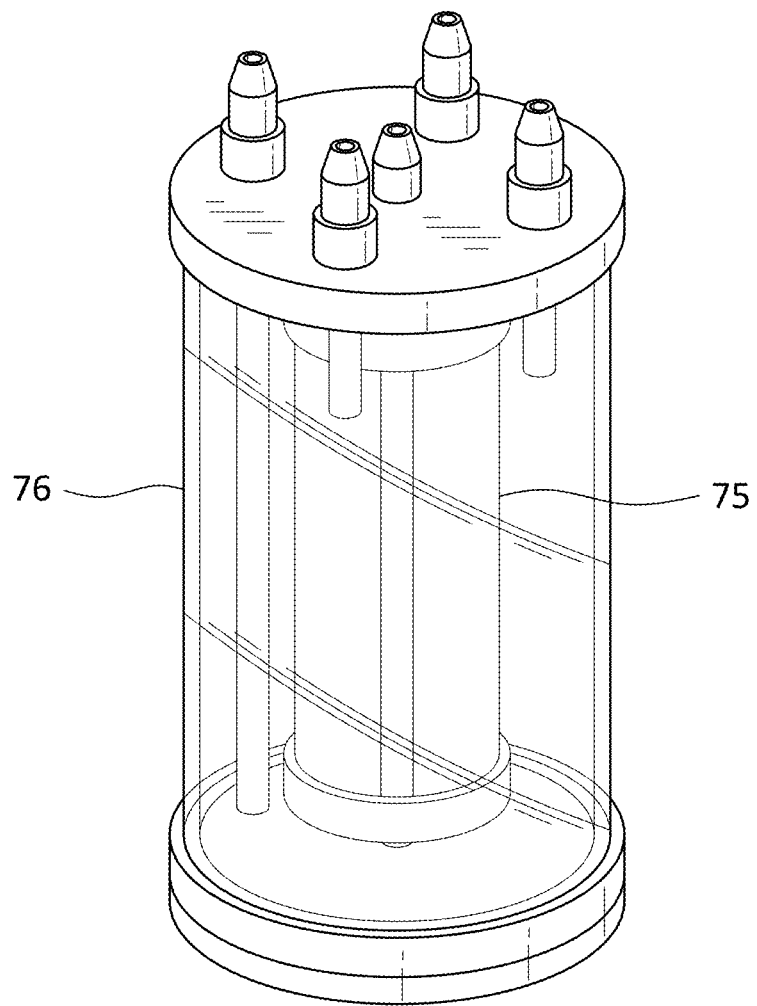
FIG. 9 is a schematic perspective view of a suspension culture vessel according to an embodiment.
Figure 10:
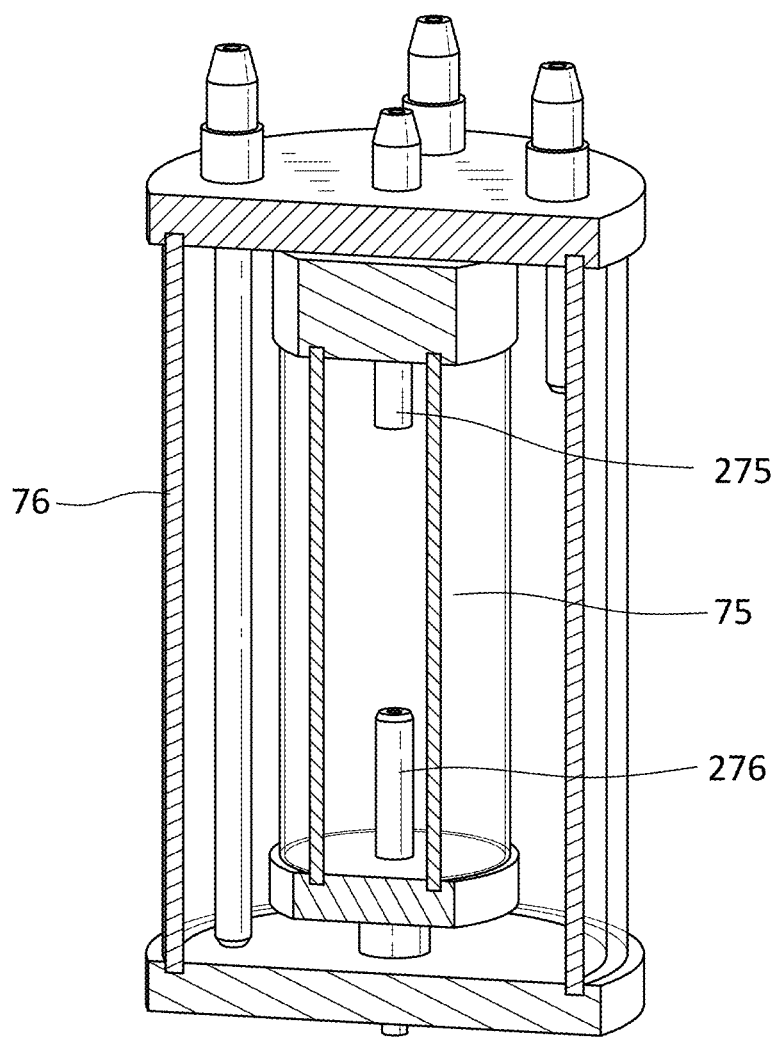
FIG. 10 is a schematic cross-sectional view of a suspension culture vessel according to an embodiment.

The reprogramming suspension culture vessel illustrated in FIG. 9 and FIG. 10, for example, comprises a dialysis tube 75 in which inducing factor-introduced cells and culture medium are placed, a container 76 in which the dialysis tube 75 is placed, with the culture medium accommodated around the periphery of the dialysis tube 75, and a pump that supplies culture medium into the dialysis tube 75 so that a liquid flow is produced inside the dialysis tube 75.

The top of the dialysis tube 75 of the reprogramming suspension culture vessel is provided with first communicating pores 275 that allow communication between the inside and outside of the dialysis tube 75, while the bottom of the dialysis tube 75 is provided with second communicating pores 276 that allow communication between the inside and outside of the dialysis tube 75. For example, culture medium is introduced into the dialysis tube 75 through the first communicating pores 275, and the introduced culture medium is directed to the bottom of the dialysis tube 75 and discharged out of the dialysis tube 75 through the second communicating pores 276. The culture medium that has been discharged through the second communicating pores 276 may be re-introduced into the dialysis tube 75 through the first communicating pores 275, via a circulating channel.

Alternatively, culture medium may be introduced into the dialysis tube 75 through the second communicating pores 276, and the introduced culture medium may be directed to the top of the dialysis tube 75 and discharged out of the dialysis tube 75 through the first communicating pores 275. The culture medium that has been discharged through the first communicating pores 275 may also be re-introduced into the dialysis tube 75 through the second communicating pores 276 via a circulating channel.

Figure 11:
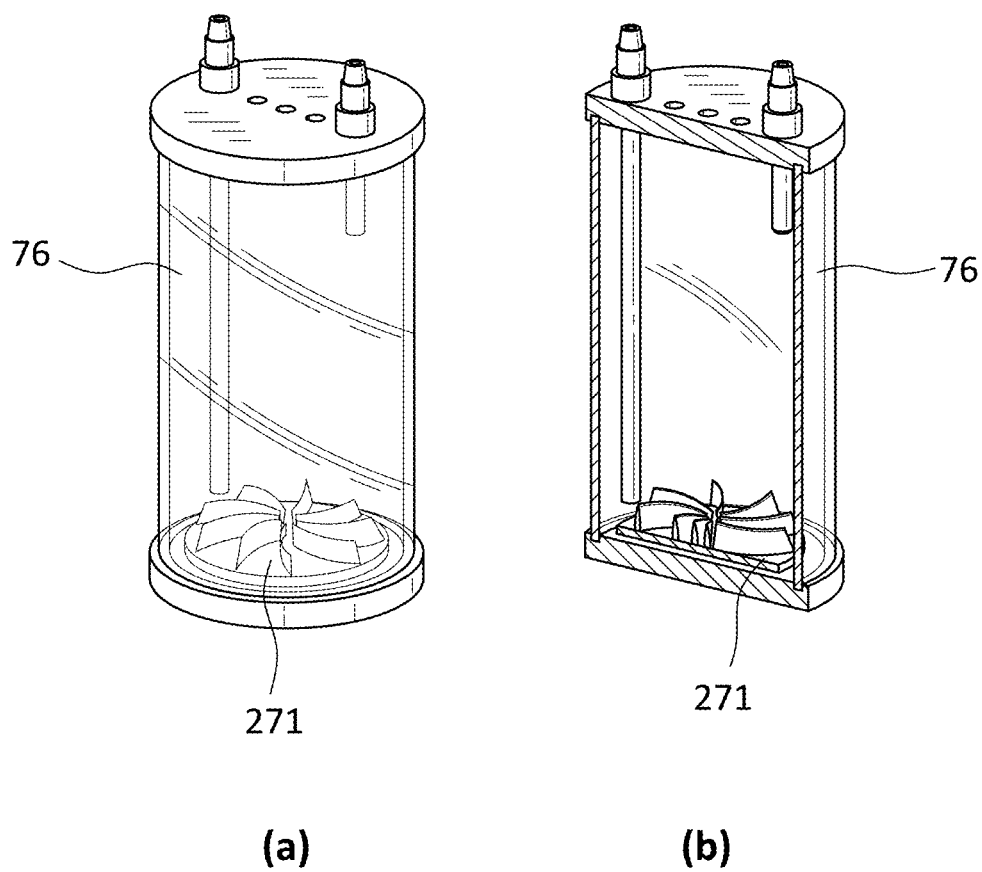
FIG. 11 is a schematic perspective view and a schematic cross-sectional view of a suspension culture vessel according to an embodiment.
Figure 12:
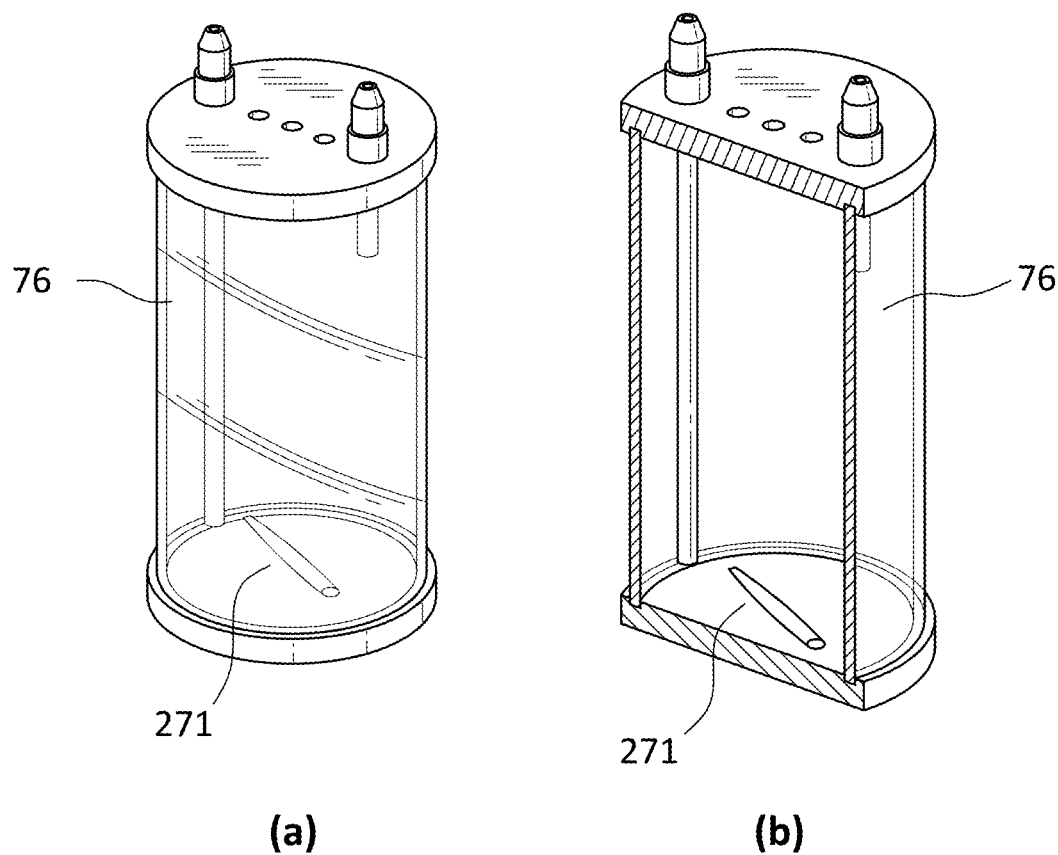
FIG. 12 is a schematic perspective view and a schematic cross-sectional view of a suspension culture vessel according to an embodiment.

A reprogramming suspension culture vessel comprising a dialysis tube has been explained with reference to FIG. 4 to FIG. 10, but the reprogramming suspension culture vessel does not need to comprise a dialysis tube, as shown in FIG. 11 and FIG. 12. In this case, the cells are cultured in the container 76 by agitated suspension culture.

The cell treatment device may further comprise an initializing culturing photographing device such as a photographing camera or video camera that photographically records culturing in the reprogramming culturing apparatus 50, as shown in FIG. 1. If a colorless culture medium is used for the culture medium in the reprogramming culturing apparatus 50, it will be possible to minimize diffuse reflection and autologous fluorescence that may be produced when using a colored culture medium. A pH indicator such as phenol red may be included however, in order to confirm the pH of the culture medium. Moreover, since induced cells and non-induced cells have differences in cellular shape and size, the cell treatment device may further comprise an induced state monitoring device that calculates the proportion of induced cells by photographing the cells in the reprogramming culturing apparatus 50. Alternatively, the induced state monitoring device may determine the proportion of induced cells by antibody immunostaining or RNA extraction. In addition, the cell treatment device may comprise a non-induced cell removing device that removes cells that have not been induced, by magnetic-activated cell sorting, flow cytometry or the like.

A first cell mass solution-feeding channel 51 is connected to the reprogramming culturing apparatus 50. The reprogramming culturing apparatus 50 employs a pump or the like to deliver a solution containing the cell masses to the first cell mass solution-feeding channel 51. The first cell mass solution-feeding channel 51 may have an inner diameter that allows passage of only induced cells of less than a prescribed size, and it may be connected to a branched fluid channel that removes non-induced cells of a prescribed size or larger.

The pump that delivers the cell mass-containing solution to the first cell mass solution-feeding channel 51 may be driven when, for example, the value of the cell mass size is at least a prescribed threshold value. Alternatively, the pump that delivers the cell mass-containing solution to the first cell mass solution-feeding channel 51 may be driven when, for example, the value of the cell mass density is at least a prescribed threshold value.

The inner wall of the first cell mass solution-feeding channel 51 may be coated with poly-HEMA to render it non-cell-adherent, so that the cells do not adhere. Alternatively, a material resistant to cell adhesion may be used as the material for the first cell mass solution-feeding channel 51. In addition, if a material with good thermal diffusivity and $CO_2$ permeability is used as the material for the first cell mass solution-feeding channel 51, the conditions in the first cell mass solution-feeding channel 51 will be equivalent to the controlled temperature and $CO_2$ concentration of the surroundings. A back-flow valve may also be provided in the first cell mass solution-feeding channel 51 from the viewpoint of preventing contamination.

The first cell mass solution-feeding channel 51 is connected to the first dissociating mechanism 60. The first dissociating mechanism 60 comprises a mesh, for example. The cell masses in the solution are dissociated into a plurality of cell masses corresponding to the sizes of the holes of the mesh, when they pass through the mesh by water pressure. If the mesh hole sizes are uniform, for example, the sizes of the plurality of cell masses after being dissociated will be approximately uniform. Alternatively, the first dissociating mechanism 60 may comprise a nozzle. For example, if the interior of an approximately conical nozzle is micromachined in a step-wise manner, a cell mass in the solution will be dissociated into a plurality of cell masses when it passes through the nozzle.

The amplifying culturing apparatus 70 is connected to the first dissociating mechanism 60. The solution including cell masses that have been dissociated at the first dissociating mechanism 60 is fed to the amplifying culturing apparatus 70.

The amplifying culturing apparatus 70 may employ an amplifying suspension culture vessel comprising a structure similar to the reprogramming suspension culture vessel illustrated in FIG. 4 to FIG. 10. In the amplifying culturing apparatus 70 as well, the plurality of cell masses are placed in the dialysis tube 75 of the suspension culture vessel shown in FIG. 4 to FIG. 10. In the amplifying culturing apparatus 70 as well, a supply culture medium solution-feeding pump may be used for exchange and supply of the culture medium surrounding the dialysis tube 75 in the container 76. Alternatively, the supply culture medium solution-feeding pump and the interior of the dialysis tube 75 in the container 76 of the suspension culture vessel may be connected by the solution-feeding tube, to supply the components necessary for culturing of cells in the culture medium in the dialysis tube 75.

Alternatively, the amplifying culturing apparatus 70 may employ an amplifying suspension culture vessel comprising a structure similar to the reprogramming suspension culture vessel illustrated in FIG. 11 and FIG. 12. In this case, the plurality of cell masses are placed in the container 76.

The cell treatment device may further comprise an amplifying culturing photographing device that photographically records culturing in the amplifying culturing apparatus 70, as shown in FIG. 1. If a colorless culture medium is used for the culture medium in the amplifying culturing apparatus 70, it will be possible to minimize diffuse reflection and autologous fluorescence that may be produced when using a colored culture medium. A pH indicator such as phenol red may be included, however, in order to confirm the pH of the culture medium. Moreover, since induced cells and non-induced cells have differences in cellular shape and size, the cell treatment device may further comprise an induced state monitoring device that calculates the proportion of induced cells by photographing the cells in the amplifying culturing apparatus 70. Alternatively, the induced state monitoring device may determine the proportion of induced cells by antibody immunostaining or RNA extraction. In addition, the cell treatment device may comprise a non-induced cell removing device that removes cells that have not been induced, by magnetic-activated cell sorting, flow cytometry or the like.

The amplifying culturing apparatus 70 feeds cell mass-containing solution to the first dissociating mechanism 60 through the amplifying culturing solution-feeding channel 71. The cell masses that have been dissociated by the first dissociating mechanism 60 are again cultured in the amplifying culturing apparatus 70. Dissociation of the cell masses at the first dissociating mechanism 60 and culturing of the cell masses in the amplifying culturing apparatus 70 are repeated until the necessary cell volume is obtained.

The pump that delivers the cell mass-containing solution in the amplifying culturing apparatus 70 to the first dissociating mechanism 60 through the amplifying culturing solution-feeding channel 71 may be driven when, for example, the value of the cell mass size is at least a prescribed threshold value. Alternatively, the pump that delivers the cell mass-containing solution to the first cell mass solution-feeding channel 51 may be driven when, for example, the value of the cell mass density is at least a prescribed threshold value.

A second cell mass solution-feeding channel 72 is connected to the amplifying culturing apparatus 70. The amplifying culturing apparatus 70 feeds the solution containing the amplifying cultured cell masses to the second cell mass solution-feeding channel 72 using a pump or the like. The second cell mass solution-feeding channel 72 may have an inner diameter that allows passage of only induced cells of less than a prescribed size, and it may be connected to a branched fluid channel that removes non-induced cells of a prescribed size or larger.

The inner wall of the second cell mass solution-feeding channel 72 may be coated with poly-HEMA to render it non-cell-adherent, so that the cells do not adhere. Alternatively, a material resistant to cell adhesion may be used as the material for the second cell mass solution-feeding channel 72. In addition, if a material with good thermal diffusivity and $CO_2$ permeability is used as the material for the second cell mass solution-feeding channel 72, then the conditions in the second cell mass solution-feeding channel 72 will be equivalent to the controlled temperature and $CO_2$ concentration of the surroundings. A back-flow valve may also be provided in the second cell mass solution-feeding channel 72 from the viewpoint of preventing contamination.

The second cell mass solution-feeding channel 72 is connected to the second dissociating mechanism 80. The second dissociating mechanism 80 comprises a mesh, for example. The cell masses in the solution are dissociated into a plurality of cell masses corresponding to the sizes of the holes of the mesh, when they pass through the mesh by water pressure. If the mesh hole sizes are uniform, for example, the sizes of the plurality of cell masses after being dissociated will be approximately uniform. Alternatively, the second dissociating mechanism 80 may comprise a nozzle. For example, if the interior of an approximately conical nozzle is micromachined in a step-wise manner, a cell mass in the solution will be dissociated into a plurality of cell masses when it passes through the nozzle.

The cell mass transport mechanism 90 that sends the plurality of cell masses in order to the packaging device 100 is connected to the second dissociating mechanism 80. A pre-packaging cell channel 91 is connected between the cell mass transport mechanism 90 and the packaging device 100. The cell mass transport mechanism 90 employs a pump or the like to send each of the cell masses that have been dissociated by the second dissociating mechanism 80, to the packaging device 100 through the pre-packaging cell channel 91.

The pre-packaging cell channel 91 is coated with poly-HEMA so that the cells do not adhere. Alternatively, a material resistant to cell adhesion may be used as the material for the pre-packaging cell channel 91. Also, by using a material with good thermal diffusivity and $CO_2$ permeability as the material of the pre-packaging cell channel 91, the conditions in the pre-packaging cell channel 91 will be equivalent to the controlled temperature and $CO_2$ concentration of the surroundings. A back-flow valve may also be provided in the pre-packaging cell channel 91 from the viewpoint of preventing contamination.

A cryopreservation liquid-feeding mechanism 110 is connected to the pre-packaging cell channel 91. The cryopreservation liquid-feeding mechanism 110 feeds a cell cryopreservation liquid into the pre-packaging cell channel 91. As a result, the cell masses are suspended in the cell cryopreservation liquid inside the pre-packaging cell channel 91.

The packaging device 100 freezes each of the plurality of cell masses in order, that have been fed through the pre-packaging cell channel 91. For example, each time it receives cell masses, the packaging device 100 places the cell masses in a cryopreservation container such as a cryotube, and immediately freezes the cell mass solution at −80° C. or below, for example. When using a cryopreservation container with a small surface area per volume, more time will tend to be necessary for freezing, and therefore it is preferred to use a cryopreservation container with a large surface area per volume. By using a cryopreservation container with a large surface area per volume it is possible to increase the survival rate of the cells after thawing. The shape of the cryopreservation container may be capillary-like or spherical, without any particular restrictions Immediate freezing is not necessarily essential, depending on the survival rate required for the cells after thawing.

Vitrification, for example, may be employed for the freezing. In this case, the cell cryopreservation liquid used may be DAP213 (Cosmo Bio Co., Ltd.) or Freezing Medium (ReproCELL, Inc.). The freezing may also be carried out by a common method other than vitrification. In this case, the cell cryopreservation liquid used may be CryoDefend-Stem Cell (R&D Systems) or STEM-CELLBANKER® (Zenoaq). The freezing may be carried out with liquid nitrogen, or it may be carried out with a Peltier element. Temperature changes can be controlled and temperature variation can be minimized by using a Peltier element. When the frozen cells are to be used in the clinic, the cryopreservation container is preferably a completely closed system. However, the packaging device 100 may package the stem cells in a storage vessel without freezing.

Figure 13:
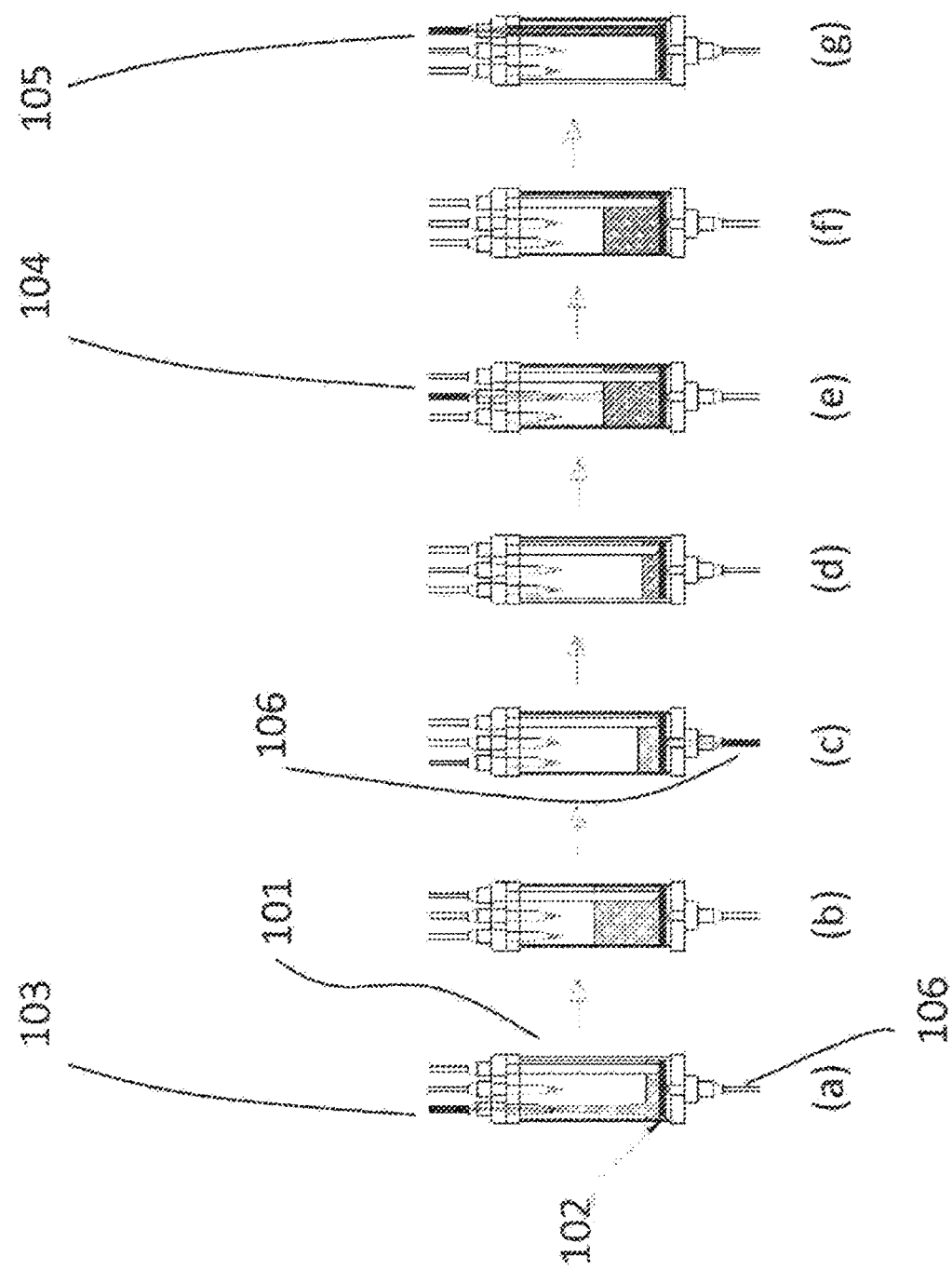
FIG. 13 is a schematic view of a solution exchanger according to an embodiment.

Alternatively, in the packaging device 100, the cell mass solution may be exchanged from the culture medium to the cryopreservation liquid using a solution exchanger 101 as illustrated in FIG. 13. Inside the solution exchanger 101 there is provided a filter 102 having at the bottom a fine hole which does not permit passage of cell masses. In the solution exchanger 101 there is also provided a cell mass introduction hole where a first solution-feeding channel 103 that feeds cell mass-containing culture medium onto the internal filter 102 is connected, an exchange solution introduction hole where a second solution-feeding channel 104 that feeds cell mass-free frozen solution onto the internal filter 102 is connected, and a cell mass outflow hole where a first discharge channel 105 that discharges cell mass-containing frozen solution onto the internal filter 102 is connected. There is also provided in the solution exchanger 101 a waste liquid outflow hole wherein there is connected a second discharge channel 106 that discharges solution that has passed through the filter 102. Tubes or the like may be used for each of the first solution-feeding channel 103, second solution-feeding channel 104, first discharge channel 105 and second discharge channel 106.

First, as shown in FIG. 13(*a*) and FIG. 13(*b*), cell mass-containing culture medium is placed inside the solution exchanger 101 from the first solution-feeding channel 103, while flow of the solution in the second discharge channel 106 is stopped. Next, as shown in FIG. 13(*c*), a state is formed allowing flow of the solution in the second discharge channel 106, and the culture medium is discharged from the solution exchanger 101. The cell mass remains on the filter 102 during this time, as shown in FIG. 13(*d*). First, as shown in FIG. 13(*e*) and FIG. 13(*f*), the cryopreservation liquid is placed inside the solution exchanger 101 from the second solution-feeding channel 104, while flow of the solution in the second discharge channel 106 is stopped, and the cell masses are dispersed in the cryopreservation liquid. Next, as shown in FIG. 13(*g*), the cell mass-containing cryopreservation liquid is discharged from the first discharge channel 105. The cell mass-containing cryopreservation liquid is sent to a cryopreservation container or the like through the first discharge channel 105.

The cell treatment device shown in FIG. 1 may also record the behavior of the separating device 10, preintroduction cell solution-feeding channel 20, inducing factor solution-feeding mechanism 21, factor introducing device 30, cell mass preparation device 40 and packaging device 100, and may transmit the image taken by the photographing device to an external server, in either a wired or wireless manner. At the external server, factors such as the conditions including the inducing factor introduction conditions, the culturing conditions and the freezing conditions, and results such as incomplete reprogramming of the stem cells, failed differentiation and growth of the stem cells and chromosomal aberrations, for example, are analyzed by a neural network, and the conditions leading to the results may be extracted and the results predicted. In addition, an external server may control the separating device 10, inducing factor solution-feeding mechanism 21, factor introducing device 30, cell mass preparation device 40 and packaging device 100 of the cell treatment device based on a standard operating procedure (SOP), monitoring whether or not each device is running based on the SOP, and may automatically produce a running record for each device.

The cell treatment device described above can automatically induce stem cells such as iPS cells.

The cell treatment device of this embodiment is not limited to the construction illustrated in FIG. 1. For example, in the cell treatment device shown in FIG. 14, blood is delivered from the blood storing unit 201 to the mononuclear cell separating unit 203, through a blood solution-feeding channel 202. Tubes, for example, may be used as the blood storing unit 201 and mononuclear cell separating unit 203. The blood solution-feeding channel 202 may be a resin tube or silicon tube, for example. This also applies for the other solution-feeding channels described below. An identifier such as a barcode is attached to the blood storing unit 201 for control of the blood information. A pump 204 is used for feeding of the solution.

The pump 204 that is used may be a positive-displacement pump. Examples of positive-displacement pumps include reciprocating pumps including piston pumps, plunger pumps and diaphragm pumps, and rotating pumps including gear pumps, vane pumps and screw pumps. Examples of diaphragm pumps include tubing pumps and piezoelectric pumps. Examples of tubing pumps include Perista Pump® (Atto Corp.) and RP-Q1 and RP-TX (Takasago Electric, Inc.). Examples of piezoelectric pumps include SDMP304, SDP306, SDM320 and APP-20KG (Takasago Electric, Inc.). A microflow chip module (Takasago Electric, Inc.) comprising a combination of various different pumps may also be used.

When a sealed pump such as a Perista Pump®, tubing pump or diaphragm pump is used, feeding can be accomplished without direct contact of the pump with the blood inside the blood solution-feeding channel 202. The same also applies to the other pumps described below. Alternatively, syringe pumps may be used for the pump 204, and for the pump 207, pump 216, pump 222, pump 225, pump 234, pump 242 and pump 252 described below. Even pumps other than sealed pumps may be reutilized after heat sterilization treatment.

An erythrocyte coagulant is fed to the mononuclear cell separating unit 203 from the separating agent storing unit 205, through a solution-feeding channel 206 and the pump 207. A tube, for example, may be used as the separating agent storing unit 205. An identifier such as a barcode is attached to the separating agent storing unit 205 for control of the separating agent information. The erythrocyte coagulant used may be, for example, HetaSep® (STEMCELL Technologies) or an Erythrocyte Coagulant (Nipro Corp.). In the mononuclear cell separating unit 203, the erythrocytes precipitate by the erythrocyte coagulant and the mononuclear cells are separated. The mononuclear cell-containing supernatant in the mononuclear cell separating unit 203 is sent to a mononuclear cell purifying filter 210 through a mononuclear cell solution-feeding channel 208 and pump 209. At the mononuclear cell purifying filter 210, components other than the mononuclear cells are removed to obtain a mononuclear cell-containing solution. The mononuclear cell purifying filter 210 used may be Purecell® (PALL), Cellsorba E (Asahi Kasei Corp.), SEPACELL PL (Asahi Kasei Corp.), ADACOLUMN® (Jimro), or a separation bag (Nipro Corp.).

Figure 14:
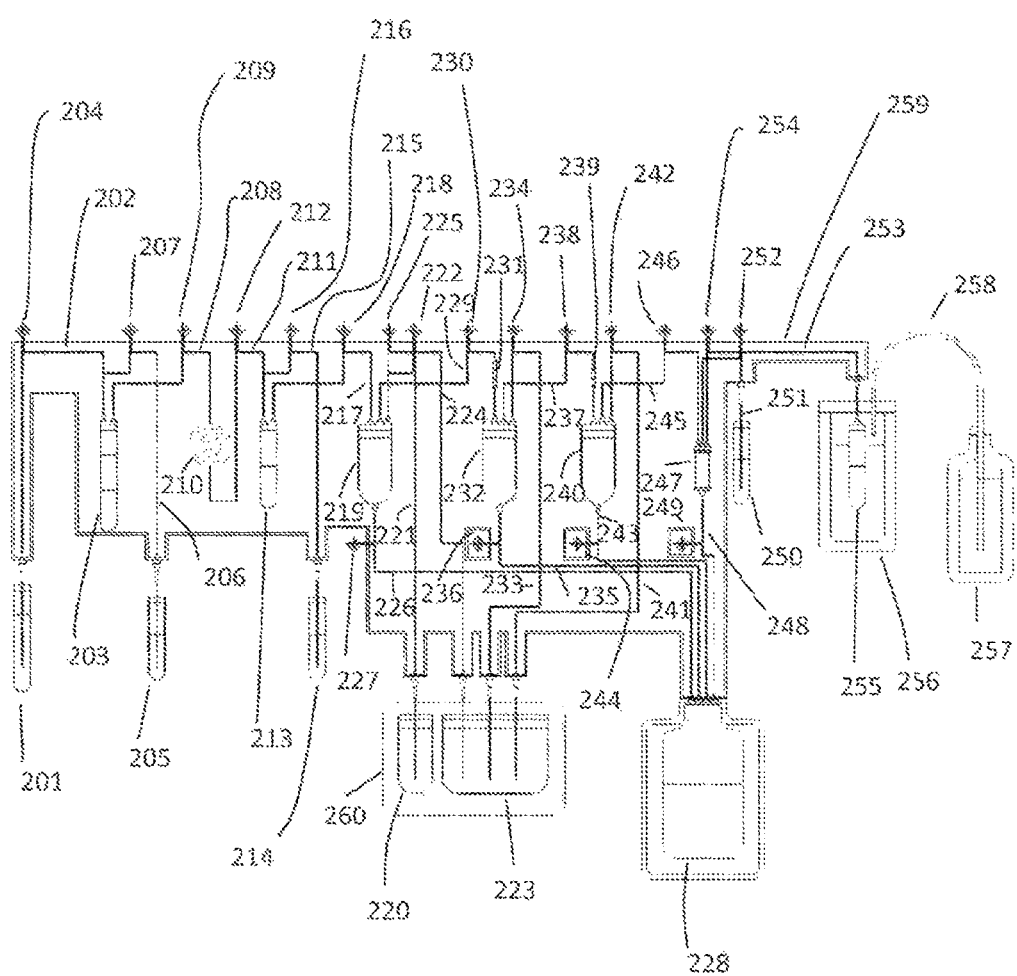
FIG. 14 is a schematic view of a cell treatment device according to an embodiment.

In FIG. 14, the mononuclear cell separating unit 203, separating agent storing unit 205, mononuclear cell purifying filter 210 and pumps 204, 207, 209 constitute the separating device.

The mononuclear cell-containing solution is sent to a factor introducing device 213 through a preintroduction cell solution-feeding channel 211 and pump 212. A tube, for example, may be used as the factor introducing device 213. Pluripotency inducing factor is fed to the factor introducing device 213 from a factor storing unit 214 including pluripotency inducing factor, through a factor solution-feeding channel 215 and the pump 216. A tube, for example, may also be used as the factor storing unit 214. An identifier such as a barcode is attached to the factor storing unit 214 for control of the pluripotency inducing factor information. The factor storing unit 214 and the pump 216 constitute the inducing factor solution-feeding mechanism. In the factor introducing device 213 serving as the factor introducing device, the pluripotency inducing factor is introduced into cells by RNA lipofection, for example, and inducing factor-introduced cells are prepared. The method of transfection of the inducing factor, however, is not limited to RNA lipofection. For example, Sendai virus vector including a pluripotency inducing factor may be used. Alternatively, the pluripotency inducing factor may be a protein.

The inducing factor-introduced cells are sent through an introduced cell solution-feeding channel 217 and pump 218 to a reprogramming suspension culture vessel 219 as a part of the cell mass preparation device. The introduced cell solution-feeding channel 217 may be temperature-permeable and $CO_2$-permeable, for example. The reprogramming suspension culture vessel 219 comprises a structure similar to that illustrated in FIG. 4 to FIG. 10, for example. In this case, the inducing factor-introduced cells are placed in a dialysis tube. Alternatively, the reprogramming suspension culture vessel 219 may comprise a structure similar to that illustrated in FIG. 11 and FIG. 12, for example. In this case, the inducing factor-introduced cells are placed in a container.

For the first few days after introduction of the pluripotency inducing factor to the cells, blood cell culture medium is supplied to the reprogramming suspension culture vessel 219 shown in FIG. 14 from a blood cell culture medium storing unit 220 including blood cell culture medium, through a culture medium solution-feeding channel 221 and pump 222. The culture medium solution-feeding channel 221 may be temperature-permeable and $CO_2$-permeable, for example. An identifier such as a barcode is attached to the blood cell culture medium storing unit 220 for control of the blood cell culture medium information. The blood cell culture medium storing unit 220, culture medium solution-feeding channel 221 and pump 222 constitute the culture medium supply device. The pump 222 may continuously supply blood cell culture medium, or it may supply blood cell culture medium at a prescribed timing.

Next, stem cell culture medium is supplied to the reprogramming suspension culture vessel 219 from a stem cell culture medium storing unit 223 including stem cell culture medium, through a culture medium solution-feeding channel 224 and pump 225. An identifier such as a barcode is attached to the stem cell culture medium storing unit 223 for control of the stem cell culture medium information. The culture medium solution-feeding channel 224 may be temperature-permeable and $CO_2$-permeable, for example. The stem cell culture medium storing unit 223, culture medium solution-feeding channel 224 and pump 225 constitute the culture medium supply device. The pump 225 may continuously supply stem cell culture medium, or it may supply stem cell culture medium at a prescribed timing.

The blood cell culture medium storing unit 220 and stem cell culture medium storing unit 223 may be placed in cold storage in the cold storage unit 260 at a low temperature of 4° C., for example. The culture medium fed from the blood cell culture medium storing unit 220 and the stem cell culture medium storing unit 223 may be fed to the culturing vessel, for example, after having the temperature raised to 37° C. with a heater outside the cold storage unit 260. Alternatively, the temperature surrounding the solution-feeding channel may be set so that the culture medium stored at low temperature increases in temperature to 37° C. while it progresses through the solution-feeding channel. The used culture medium in the reprogramming suspension culture vessel 219 is sent to a waste liquid storage section 228 through a waste liquid solution-feeding channel 226 and pump 227. An identifier such as a barcode is attached to the waste liquid storage section 228 for control of the waste liquid information.

The cell masses that have been cultured at the reprogramming suspension culture vessel 219 are sent to a first amplifying suspension culture vessel 232 constituting part of the cell mass preparation device, through an introduced cell solution-feeding channel 229, pump 230 and cell mass dissociator 231. By passing through the cell mass dissociator 231, the cell masses are dissociated into smaller cell masses. The first amplifying suspension culture vessel 232 comprises a structure similar to that illustrated in FIG. 4 to FIG. 10, for example. In this case, the cell masses are placed in a dialysis tube. Alternatively, the first amplifying suspension culture vessel 232 may comprise a structure similar to that illustrated in FIG. 11 and FIG. 12, for example. In this case, the cell masses are placed in a container.

Stem cell culture medium is supplied to the first amplifying suspension culture vessel 232 shown in FIG. 14, from the stem cell culture medium storing unit 223 that includes stem cell culture medium, through a culture medium solution-feeding channel 233 and pump 234. The introduced cell solution-feeding channel 229 and culture medium solution-feeding channel 233 may be temperature-permeable and $CO_2$-permeable, for example. The stem cell culture medium storing unit 223, culture medium solution-feeding channel 233 and pump 234 constitute the culture medium supply device. The pump 234 may continuously supply stem cell culture medium, or it may supply stem cell culture medium at a prescribed timing.

The used culture medium in the first amplifying suspension culture vessel 232 is sent to the waste liquid storage section 228 through a waste liquid solution-feeding channel 235 and pump 236.

The cell masses that have been cultured at the first amplifying suspension culture vessel 232 are sent to a second amplifying suspension culture vessel 240 constituting part of the cell mass preparation device, through an introduced cell solution-feeding channel 237, pump 238 and cell mass dissociator 239. By passing through the cell mass dissociator 239, the cell masses are dissociated into smaller cell masses. The second amplifying suspension culture vessel 240 shown in FIG. 14 comprises a structure similar to that illustrated in FIG. 4 to FIG. 10, for example. In this case, the cell masses are placed in a dialysis tube. Alternatively, the second amplifying suspension culture vessel 240 may comprise a structure similar to that illustrated in FIG. 11 and FIG. 12, for example. In this case, the cell masses are placed in a container.

Stem cell culture medium is supplied to the second amplifying suspension culture vessel 240 shown in FIG. 14, from the stem cell culture medium storing unit 223 that includes stem cell culture medium, through a culture medium solution-feeding channel 241 and pump 242. The introduced cell solution-feeding channel 237 and culture medium solution-feeding channel 241 may be temperature-permeable and $CO_2$-permeable, for example. The stem cell culture medium storing unit 223, culture medium solution-feeding channel 241 and pump 242 constitute the culture medium supply device. The pump 242 may continuously supply stem cell culture medium, or it may supply stem cell culture medium at a prescribed timing.

The used culture medium in the second amplifying suspension culture vessel 240 is sent to the waste liquid storage section 228 through a waste liquid solution-feeding channel 243 and pump 244.

The cell masses that have been cultured in the second amplifying suspension culture vessel 240 are sent to a solution exchanger 247 through an introduced cell solution-feeding channel 245 and pump 246. The solution exchanger 247 comprises the construction shown in FIG. 13, for example. In the solution exchanger 247 shown in FIG. 14, the cell masses are held at a filter while the culture medium is sent to the waste liquid storage section 228 through a waste liquid solution-feeding channel 248 and pump 249.

After stopping flow of the solution in the waste liquid solution-feeding channel 248 by stopping driving of the pump 249, or after closing the waste liquid solution-feeding channel 248 with a valve or the like, cryopreservation liquid is placed in the solution exchanger 247 from a cryopreservation liquid storing unit 250, that contains cryopreservation liquid, through a solution-feeding channel 251 and pump 252. This disperses the cell masses in the cryopreservation liquid.

The cryopreservation liquid that has dispersed the cell masses is fed into a cryopreservation container 255 through a solution-feeding channel 253 and pump 254, constituting parts of the packaging device. The cryopreservation container 255 is situated in a low-temperature repository 256. Liquid nitrogen at −80° C., for example, is fed to the low-temperature repository 256 from a liquid nitrogen repository 257, through a solution-feeding channel 258. The cell masses in the cryopreservation container 255 are thus frozen. Freezing of the cell masses does not need to be by liquid nitrogen, however. For example, the low-temperature repository 256 may be a freezer such as a compression freezer, an absorption freezer or a Peltier freezer.

Back-flow valves may also be provided in the solution-feeding channels as appropriate. The solution-feeding channels, mononuclear cell separating unit 203, mononuclear cell purifying filter 210, factor introducing device 213, reprogramming suspension culture vessel 219, first amplifying suspension culture vessel 232, second amplifying suspension culture vessel 240 and solution exchanger 247 are situated in an element 259, for example. The material of the element 259 may be, but is not limited to, a resin, for example. The element 259 is made of a sterilizable heat-resistant material, for example. The element 259 may be in the form of a plate or a cassette. The element 259 may also be a flexible bag. The solution-feeding channel through which the culture medium flows is made of a $CO_2$-permeable material, for example. The solution-feeding channels, mononuclear cell separating unit 203, mononuclear cell purifying filter 210, factor introducing device 213, reprogramming suspension culture vessel 219, first amplifying suspension culture vessel 232, second amplifying suspension culture vessel 240 and solution exchanger 247 may also be housed in a plurality of separate cases.

The element 259 and the channel provided in the element 259 may be disposable, for example, and upon completion of freezing of the cell masses, they may be discarded and exchanged with new ones. Alternatively, when the element 259 and the channel provided in the element 259 are to be reused, an identifier such as a barcode may be attached to the element 259 to manage the number of times used, etc.

The cell treatment device of this embodiment as described above can automatically induce stem cells such as iPS cells.

An embodiment of the invention has been described above, but the description and pertinent drawings that are intended merely to constitute part of the disclosure are not to be understood as limiting the invention. Various alternative embodiments, embodiments and operating technologies will be readily apparent to a person skilled in the art from this disclosure. For example, the factor introducing device 30 may induce the cells not by electroporation or RNA lipofection, but rather by a viral vector such as retrovirus, lentivirus or Sendai virus, or by transfection using plasmids, or by protein transfection. Also, the preintroduction cell solution-feeding channel 20, introduced cell solution-feeding channel 31, cell mass solution-feeding channel 51, amplifying culturing solution-feeding channel 71, cell mass solution-feeding channel 72 and pre-packaging cell channel 91 may be provided on a substrate by a microfluidics technique. It will therefore be understood that the invention encompasses various embodiments not described herein.

EXAMPLES

Example 1

After seeding $5\times10^6$ fibroblasts (HDF1419, Cell Applications, Inc.) suspended in DMEM (Gibco) containing 10% FBS (Gibco), as a non-gel liquid medium, in each well of a well dish, the well dish was allowed to stand in a $CO_2$ incubator at 37° C. for adhesion culture of the fibroblasts. After 24 hours, a pantropic retrovirus-expressing system (Plat-GP, Pantropic, Plat-GP) was used to introduce reprogramming factor OSKM (OCT3/4, SOX2, KLF4, c-MYC) into the fibroblasts. From 7 days onward, the medium was exchanged every 24 hours.

The cells were released from the wells using 0.25% trypsin, and the cell count was measured. Also, deacylated gellan gum was added at 0.02 mass % to bFGF-free hES medium (Primate ES Cell Medium, ReproCELL, Inc.), to prepare a gel medium. The cells were suspended in the prepared gel medium to a density of $1\times10^5$/mL, and placed in the container of the culture vessel. A magnet and stirrer were then utilized for agitated suspension culture of the cells in a $CO_2$ incubator for 22 days. Every 48 hours during this period, 10 mL of culture medium was added to the culture vessel.

Figure 15:
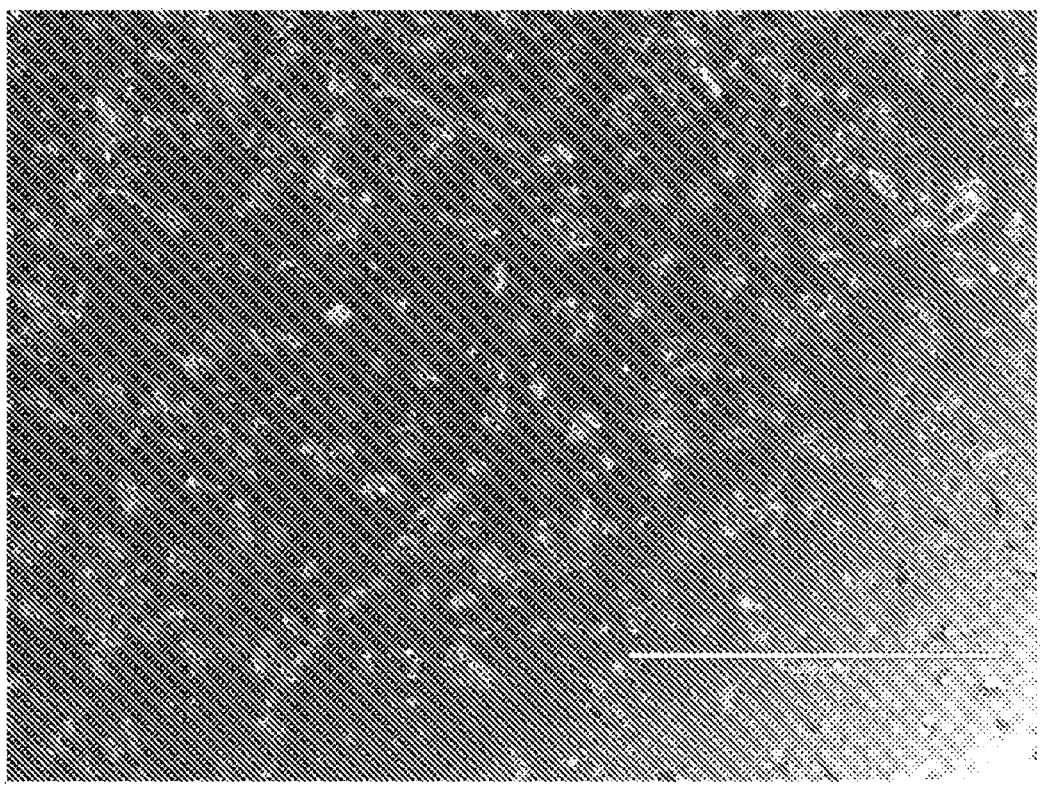
FIG. 15 is a photomicrograph showing the mass of induced cells of Example 1.
Figure 16:
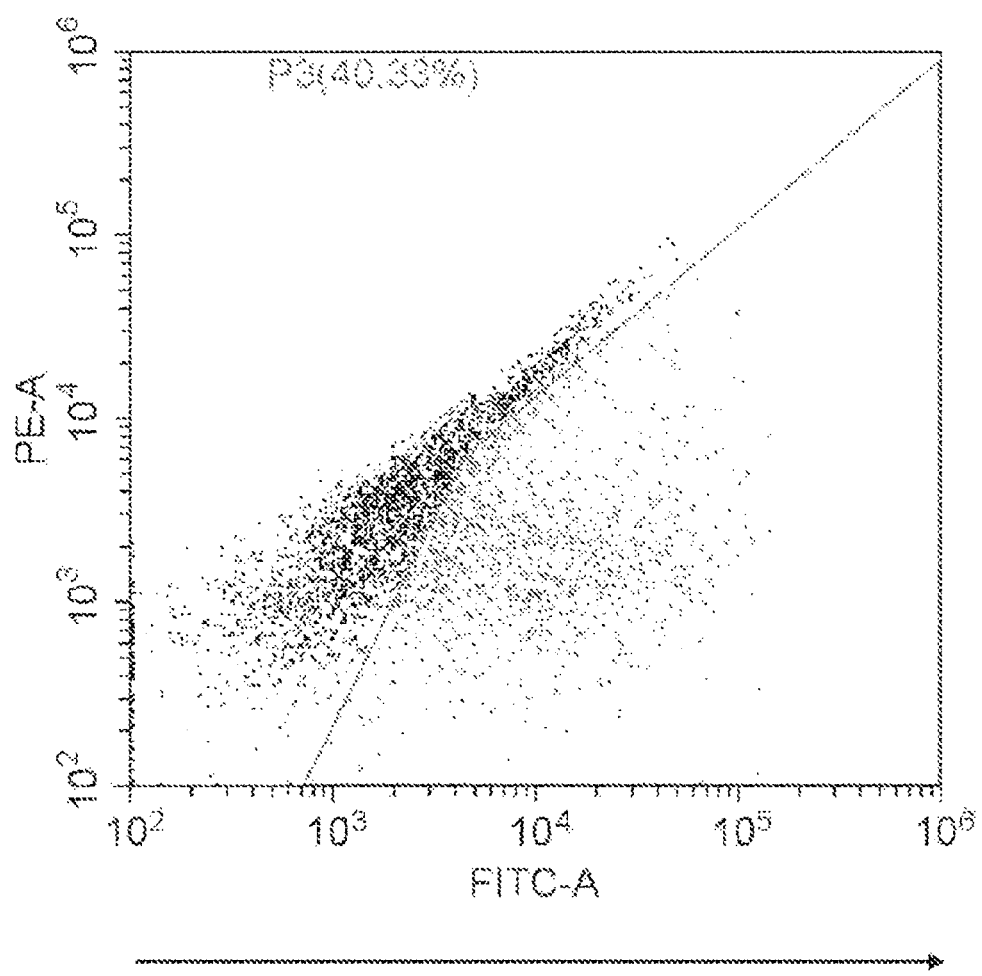
FIG. 16 is a dot plot obtained by FACS (Fluorescence Activated Cell Sorting) in Example 1.
Figure 17:
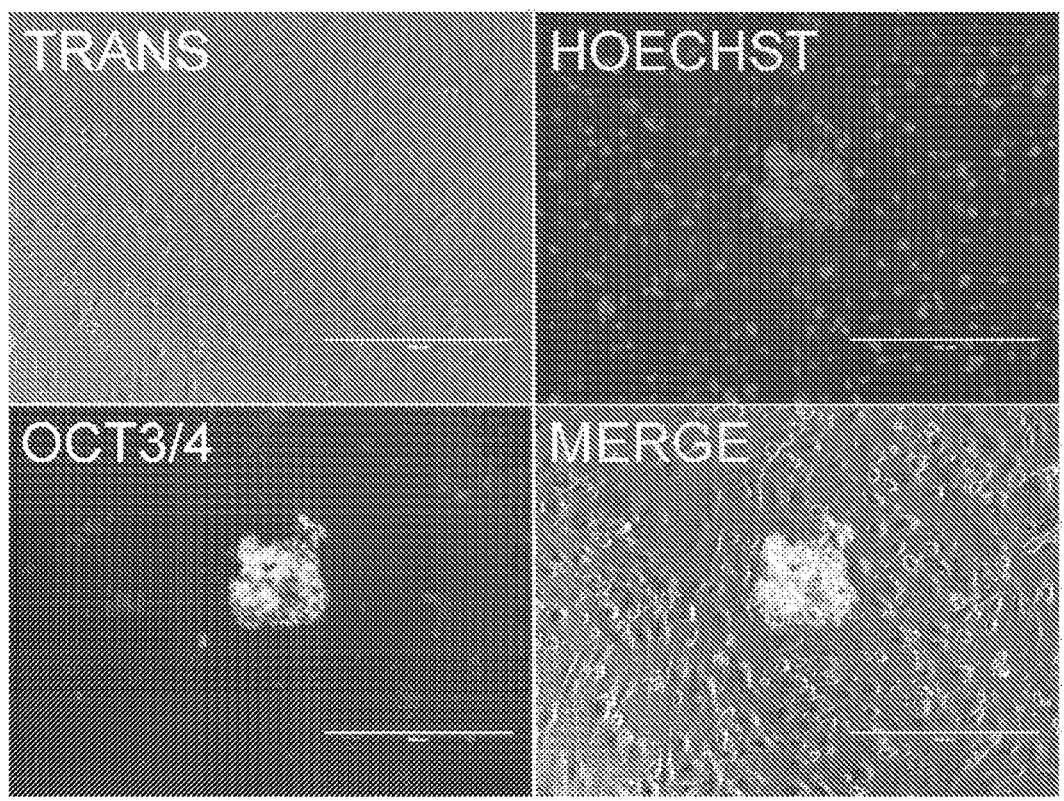
FIG. 17 is a photomicrograph showing the induced cells of Example 1.
Figure 18:
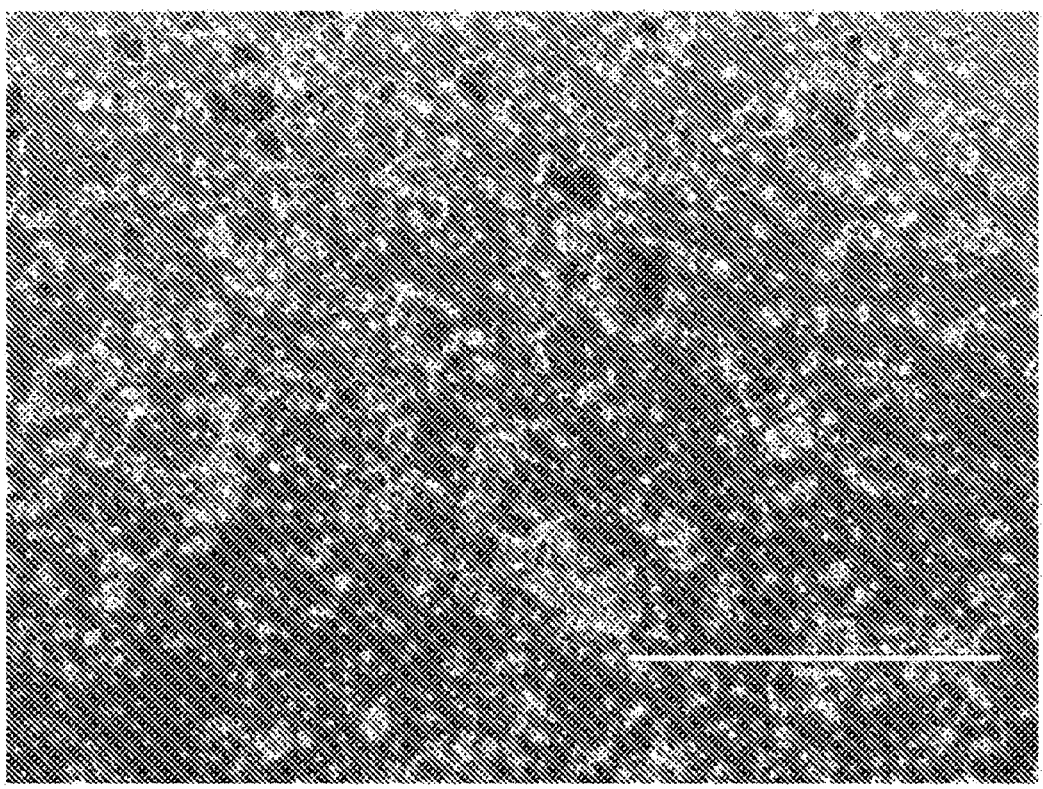
FIG. 18 is a photomicrograph showing the mass of induced cells of Example 2.

As seen in the photograph of FIG. 15, formation of cell masses was confirmed after culturing. The cell mass sizes were more uniform compared to when a non-gel liquid medium was used, as described below (FIG. 18). A portion of the collected cells was analyzed by FACS using antibody for TRA-1-60, as an undifferentiated cell surface marker, whereby the cells were confirmed to be TRA-1-60-positive, as shown in FIG. 16. The remaining collected cells were seeded on feeder cells and cultured for 5 days. The cell colonies were then fixed with paraformaldehyde and the cells were immunostained with antibody for OCT3/4, whereby the cells were confirmed to be OCT3/4-positive, as shown in FIG. 17. It was thus demonstrated that iPS cells had been induced from the fibroblasts.

Example 2

Reprogramming factor OSKM (OCT3/4, SOX2, KLF4, c-MYC) was introduced into fibroblasts in the same manner as Example 1. From 7 days onward, the medium was exchanged every 24 hours.

The cells were released from the wells using 0.25% trypsin, and the cell count was measured. bFGF-containing hES medium (Primate ES Cell Medium, ReproCELL, Inc.) was also prepared. The medium was non-gel liquid medium without addition of a polymer. The cells were suspended in the prepared liquid medium to a density of $1\times10^5$/mL, and placed in the container of the culture vessel. A magnet and stirrer were then utilized for agitated suspension culture of the cells in a $CO_2$ incubator for 8 days. Every 48 hours during this period, 10 mL of culture medium was added to the culture vessel.

Figure 19:
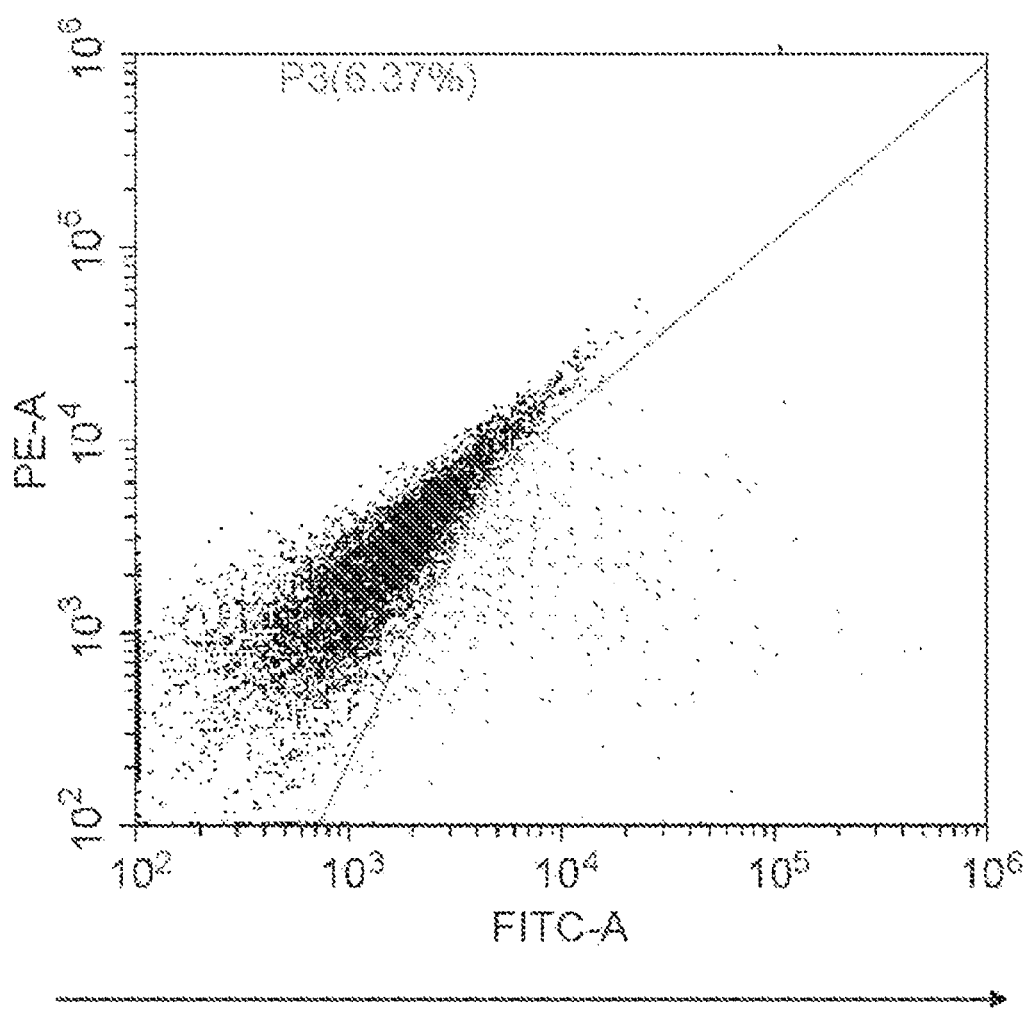
FIG. 19 is a dot plot obtained by FACS in Example 2.
Figure 20:
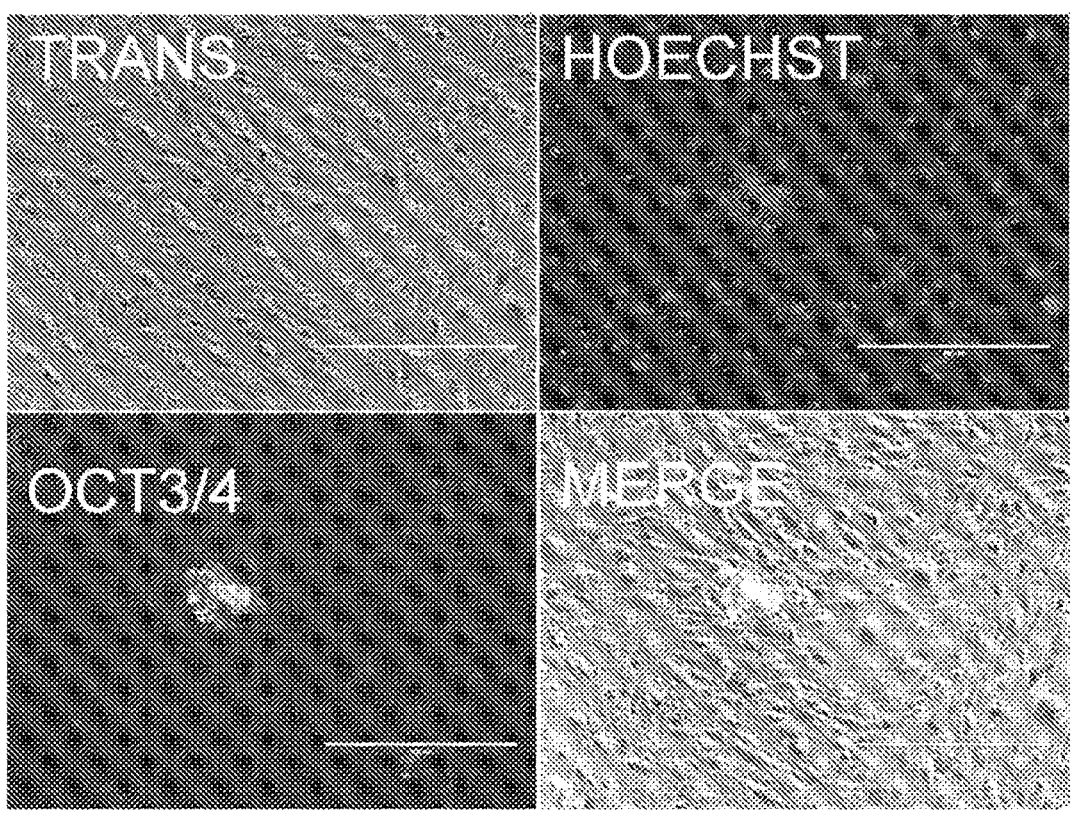
FIG. 20 is a photomicrograph showing the induced cells of Example 2.

As seen in the photograph of FIG. 18, formation of cell masses was confirmed after culturing. A portion of the collected cells was analyzed by FACS using antibody for TRA-1-60, as an undifferentiated cell surface marker, whereby the cells were confirmed to be TRA-1-60-positive, as shown in FIG. 19. The remaining collected cells were seeded on feeder cells and cultured for 5 days. The cell colonies were then fixed with paraformaldehyde and the cells were immunostained with antibody for OCT3/4, whereby the cells were confirmed to be OCT3/4-positive, as shown in FIG. 20. It was thus demonstrated that the fibroblasts had been reprogrammed and iPS cells had been induced.

Example 3

Reprogramming factor OSKM (OCT3/4, SOX2, KLF4, c-MYC) was introduced into fibroblasts in the same manner as Example 1. From 7 days onward, the medium was exchanged every 24 hours.

The cells were released from the wells using 0.25% trypsin, and the cell count was measured. Also, deacylated gellan gum was added at 0.02 mass % to bFGF-free hES medium (Primate ES Cell Medium, ReproCELL, Inc.), to prepare a gel medium. The cells were suspended in the prepared gel medium to a density of $1\times10^5$/mL, and placed in a culture vessel without a dialysis tube, or in the dialysis tube of a culture vessel such as shown in FIG. 5.

The culture vessel, of either type, was set in a $CO_2$ incubator. For the culture vessel without a dialysis tube, the cells were then suspension cultured for 20 days without agitation of the gel medium. For the culture vessel with a dialysis tube, a magnet and stirrer were utilized to agitate the gel medium in the container on the outside of the dialysis tube, during suspension culturing of the cells for 20 days. Every 48 hours during this period, 10 mL of culture medium was added to the culture vessel.

Figure 21:
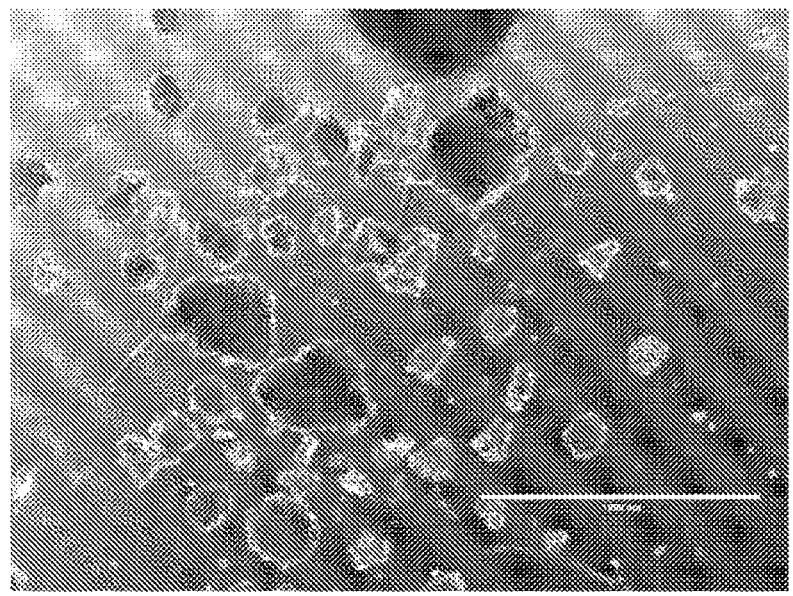
FIG. 21 is a photomicrograph showing the mass of induced cells of Example 3.
Figure 21:
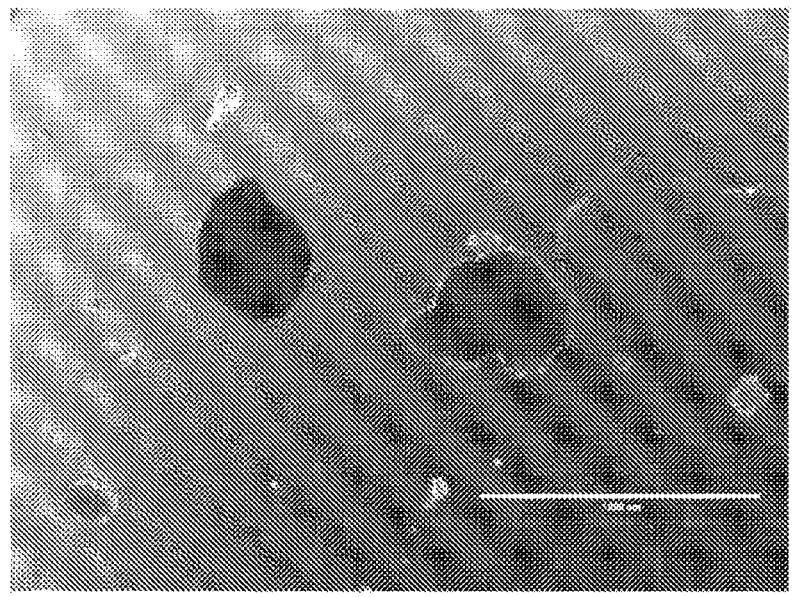
Figure 22:
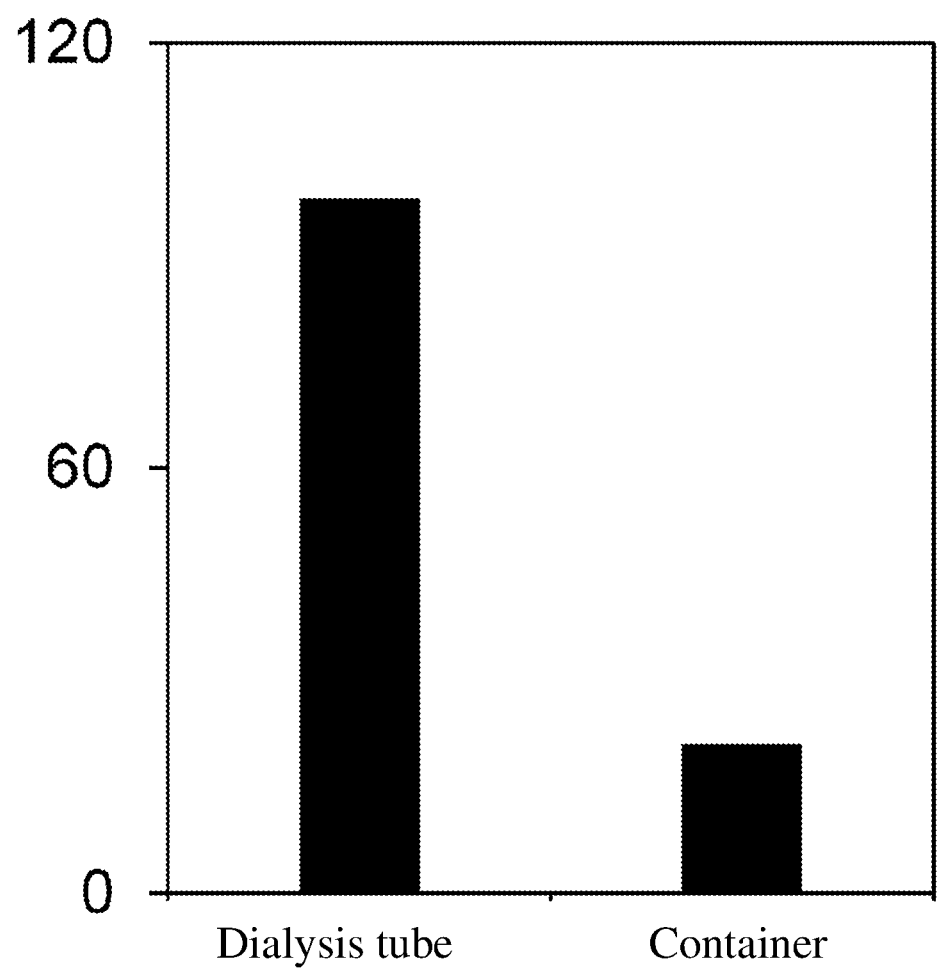
FIG. 22 is a graph showing the number of cell masses in Example 3.
Figure 23:
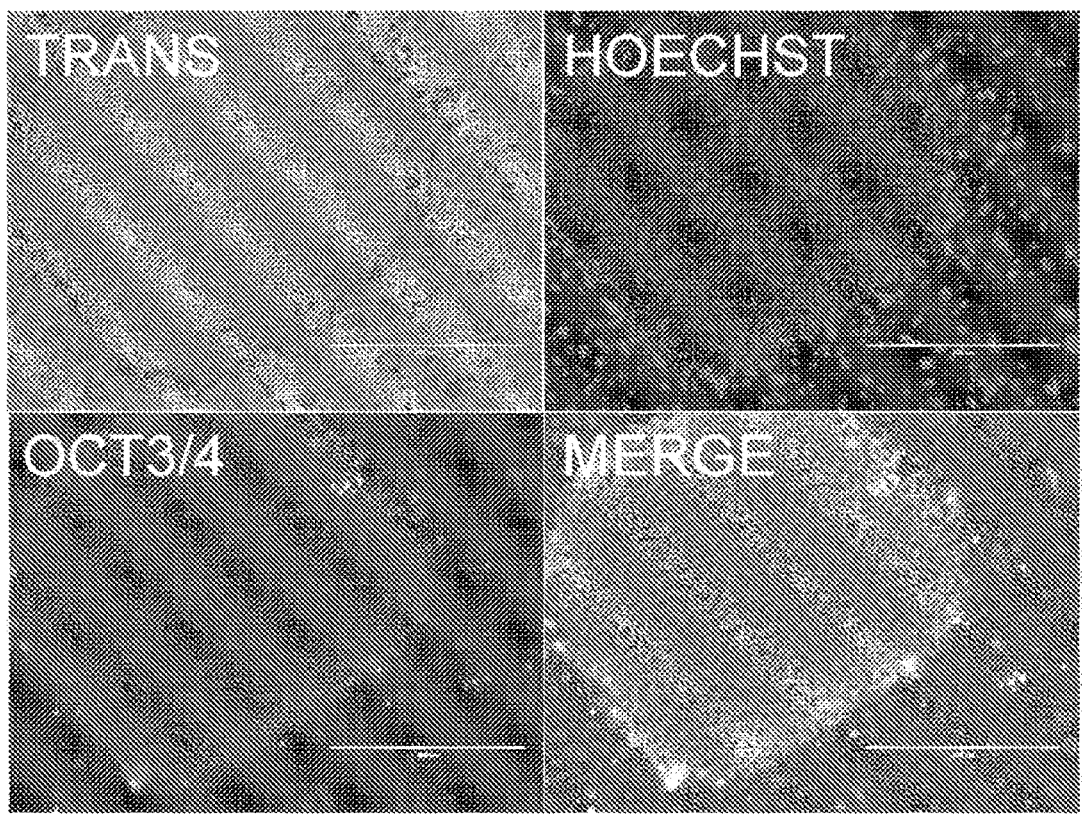
FIG. 23 is a photomicrograph of cells that were induction cultured using a dialysis tube in Example 3.
Figure 24:
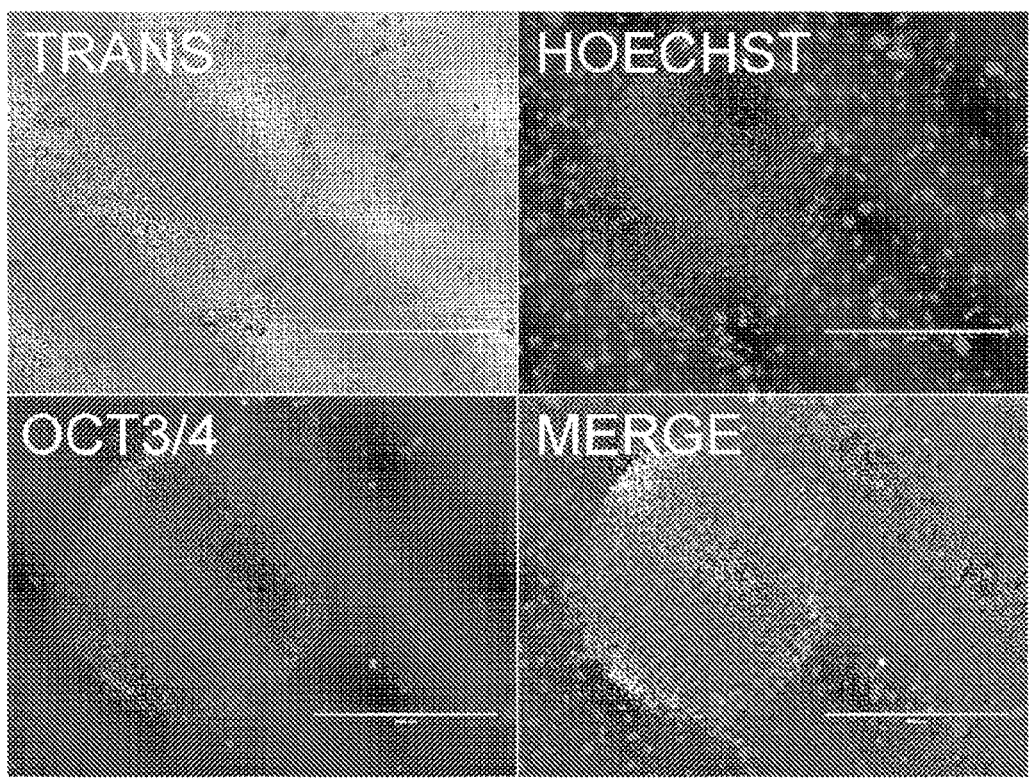
FIG. 24 is a photomicrograph of cells that were induction cultured without using a dialysis tube in Example 3.

As seen in the photograph of FIG. 21, formation of cell masses was confirmed after culturing. Upon measuring the collected cell count, it was found that the cell count was greater with agitation culture of the cells placed in a dialysis tube, compared to the same without placement in a dialysis tube, as shown in FIG. 22. This indicates that nutrients and other components had been efficiently supplied to the cells in the dialysis tube, from the agitated medium outside of the dialysis tube. The collected cells were seeded on feeder cells and cultured for 5 days. The cell colonies were then fixed with paraformaldehyde and the cells were immunostained with antibody for OCT3/4, whereby it was confirmed that the cells were OCT3/4-positive, as shown in FIG. 23 (culturing with dialysis tube) and FIG. 24 (culturing without dialysis tube). It was thus demonstrated that iPS cells had been induced from the fibroblasts.

EXPLANATION OF SYMBOLS

10: Separating device, 20: preintroduction cell solution-feeding channel, 21: inducing factor solution-feeding mechanism, 30: factor introducing device, 31: introduced cell solution-feeding channel, 40: cell mass preparation device, 50: reprogramming culturing apparatus, 51: cell mass solution-feeding channel, 60: dissociating mechanism, 70: amplifying culturing apparatus, 71: amplifying culturing solution-feeding channel, 72: cell mass solution-feeding channel, 74: drive unit, 75: dialysis tube, 76: container, 80: dissociating mechanism, 90: cell mass transport mechanism, 91: pre-packaging cell channel, 100: packaging device, 101: solution exchanger, 102: filter, 103: solution-feeding channel, 104: solution-feeding channel, 105: discharge channel, 106: discharge channel, 110: cryopreservation liquid-feeding mechanism, 201: blood storing unit, 202: blood solution-feeding channel, 203: mononuclear cell separating unit, 204: pump, 205: separating agent storing unit, 206: solution-feeding channel, 207: pump, 208: mononuclear cell solution-feeding channel, 209: pump, 210: mononuclear cell purifying filter, 211: preintroduction cell solution-feeding channel, 212: pump, 213: factor introducing device, 214: factor storing unit, 215: factor solution-feeding channel, 216: pump, 217: introduced cell solution-feeding channel, 218: pump, 219: reprogramming suspension culture vessel, 220: blood cell culture medium storing unit, 221: culture medium solution-feeding channel, 222: pump, 223: stem cell culture medium storing unit, 224: culture medium solution-feeding channel, 225: pump, 226: waste liquid solution-feeding channel, 227: pump, 228: waste liquid storage section, 229: introduced cell solution-feeding channel, 230: pump, 231: cell mass dissociator, 232: amplifying suspension culture vessel, 233: culture medium solution-feeding channel, 234: pump, 235: waste liquid solution-feeding channel, 236: pump, 237: introduced cell solution-feeding channel, 238: pump, 239: cell mass dissociator, 240: amplifying suspension culture vessel, 241: culture medium solution-feeding channel, 242: pump, 243: waste liquid solution-feeding channel, 244: pump, 245: introduced cell solution-feeding channel, 246: pump, 247: solution exchanger, 248: waste liquid solution-feeding channel, 249: pump, 250: cryopreservation liquid storing unit, 251: solution-feeding channel, 252: pump, 253: solution-feeding channel, 254: pump, 255: cryopreservation container, 256: low-temperature repository, 257: liquid nitrogen repository, 258: solution-feeding channel, 259: element, 260: cold storage unit, 271: agitating member, 272: groove, 273: communicating pores, 274: communicating pores, 275: communicating pores, 276: communicating pores.

The invention claimed is:
1. A method for manufacturing pluripotent stem cells comprising:
introducing a pluripotency inducing factor into cells to create inducing factor-introduced cells by a factor introducer;
transferring the inducing factor-introduced cells from the factor introducer to a suspension culture vessel through an introduced cell solution-feeding channel, wherein the introduced cell solution-feeding channel is configured to send a solution that contains the inducing factor-introduced cells from the factor introducer to the suspension culture vessel, the suspension culture vessel comprises a container and a semipermeable membrane in the form of a tube inside the container, and the inducing factor-introduced cells are transferred from the factor introducer to inside of the tube of the semipermeable membrane;
suspension culturing the inducing factor-introduced cells in the tube of the semipermeable membrane in the suspension culture vessel, until pluripotent stem cells are induced from the inducing factor-introduced cells and a colony of the induced pluripotent stem cells is formed; and agitating a culture medium in the container of the suspension culture vessel by an agitator only from outside of the tube of the semipermeable membrane.

2. The method according to claim 1, wherein the inducing factor-introduced cells are reprogrammed inside the suspension culture vessel.

3. The method according to claim 1, wherein the induced cells are amplifying cultured inside the suspension culture vessel.

4. The method according to claim 1, further comprising: introducing culture medium outside the tube of the semipermeable membrane and inside the container.

5. The method according to claim 1,
wherein the suspension culture vessel further comprises a drive unit, and
in the agitating, the agitator is rotated by the drive unit.

6. The method according to claim 1, wherein in the agitating, the culture medium in the container is agitated such that a flow rate of the culture medium inside the tube of the semipermeable membrane is slower than a flow rate of the culture medium outside the tube of the semipermeable membrane.

7. A method for manufacturing pluripotent stem cells comprising:
preparing a suspension culture vessel comprising
a container,
a semipermeable membrane in the form of a tube placed in the container,
a first solution-feeding channel connected to the container,
an agitator provided outside the tube of the semipermeable membrane and inside the container, and
a second solution-feeding channel connected to the container;
introducing a culture medium containing an inducing factor-introduced cells into the tube of the semipermeable membrane through the first solution-feeding channel;
introducing a culture medium in the container around a periphery of the semipermeable membrane;
suspension-culturing the inducing factor-introduced cells in the tube of the semipermeable membrane until pluripotent stem cells are induced from the inducing factor-introduced cells and a colony of the pluripotent stem cells is formed;
agitating the culture medium only from outside of the tube of the semipermeable membrane and inside the container by the agitator; and
transferring the induced pluripotent stem cells from the tube of the semipermeable membrane to an outside of the container through the second solution-feeding channel.

8. The method according to claim 7, further comprising:
driving the agitator by a drive unit provided outside the container by magnetic force.

9. The method according to claim 7, wherein in the agitating, the culture medium is agitated such that a flow rate of the culture medium inside the tube of the semipermeable membrane is slower than a flow rate of the culture medium outside the tube of the semipermeable membrane.

* * * * *